(12) United States Patent
Bell et al.

(10) Patent No.: US 8,920,743 B2
(45) Date of Patent: Dec. 30, 2014

(54) FAUCET MOUNTABLE WATER CONDITIONING DEVICES

(75) Inventors: Russell Bell, Pleasanton, CA (US);
Patrick O'Loughlin, Pleasanton, CA (US); William Ouellette, Pleasanton, CA (US); Rachel Robinette, Pleasanton, CA (US); Evan Rumberger, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 421 days.

(21) Appl. No.: 13/427,675

(22) Filed: Mar. 22, 2012

(65) Prior Publication Data
US 2013/0081709 A1 Apr. 4, 2013

Related U.S. Application Data

(60) Provisional application No. 61/472,423, filed on Apr. 6, 2011, provisional application No. 61/472,442, filed on Apr. 6, 2011.

(51) Int. Cl.
| | |
|---|---|
| *C02F 1/50* | (2006.01) |
| *C02F 1/68* | (2006.01) |
| *C02F 1/76* | (2006.01) |
| *E03B 1/04* | (2006.01) |
| *E03C 1/04* | (2006.01) |
| *C02F 1/00* | (2006.01) |
| *E03C 1/046* | (2006.01) |

(52) U.S. Cl.
CPC ... *E03B 1/04* (2013.01); *C02F 1/50* (2013.01); *C02F 1/688* (2013.01); *C02F 1/76* (2013.01); *C02F 1/003* (2013.01); *E03C 1/0465* (2013.01); *C02F 2201/004* (2013.01); *C02F 2307/06* (2013.01)
USPC ............ 422/263; 137/268; 422/266; 422/275

(58) Field of Classification Search
CPC ............ C02F 1/003; C02F 1/50; C02F 1/686; C02F 1/687; C02F 1/688; C02F 1/76; C02F 1/766; C02F 2201/004; C02F 2307/06; E03C 1/046; E03C 1/0465
USPC .......... 210/206, 232, 235; 422/263, 266, 275; 137/268
See application file for complete search history.

(56) References Cited

U.S. PATENT DOCUMENTS

| | | | |
|---|---|---|---|
| 649,082 | A | 5/1900 | Stahle |
| 2,986,340 | A | 5/1961 | Webb |

(Continued)

FOREIGN PATENT DOCUMENTS

| | | |
|---|---|---|
| CN | 201354325 | 12/2009 |
| CN | 201525770 | 7/2010 |

(Continued)

OTHER PUBLICATIONS

International PCT Search Report; PCT/US2012/030284;The Clorox Company; Jun. 12, 2012.

(Continued)

*Primary Examiner* — Lucas Stelling
(74) *Attorney, Agent, or Firm* — Alok Goel

(57) ABSTRACT

A faucet mountable water conditioning devices include a relatively simple configuration that allows for reduced cost, easy installation, and a pleasing aesthetic. In one or more implementations, a faucet mountable water conditioning device includes a universal faucet mounting mechanism. The universal faucet mounting mechanism allows the faucet mountable water conditioning device to connect and seal to a wide variety of faucet designs and sizes simply by pressing the mounting mechanism over the faucet. The faucet mountable water conditioning device can also include a base configured to hold a water conditioning source. In one or more implementations a connector can couple the base to the mounting mechanism; thereby, allowing the base to move between active and inactive positions.

16 Claims, 14 Drawing Sheets

(56) References Cited

U.S. PATENT DOCUMENTS

| | | | |
|---|---|---|---|
| 3,154,495 A | 10/1964 | Robson et al. | |
| 3,342,674 A | 9/1967 | Kowalski | |
| 3,562,165 A | 2/1971 | Altieri | |
| 3,607,759 A | 9/1971 | Barth | |
| 3,679,054 A * | 7/1972 | Muller | 210/95 |
| 3,753,676 A | 8/1973 | Halley | |
| 3,856,932 A | 12/1974 | May | |
| 3,978,235 A | 8/1976 | Schiro | |
| 3,998,751 A | 12/1976 | Murray | |
| 4,145,306 A | 3/1979 | Tatara | |
| 4,192,763 A | 3/1980 | Buchan | |
| 4,200,606 A | 4/1980 | Kitko | |
| 4,265,847 A | 5/1981 | Hunt | |
| 4,334,610 A | 6/1982 | Ota | |
| 4,355,014 A | 10/1982 | Murakami et al. | |
| 4,367,144 A | 1/1983 | Peters et al. | |
| 4,536,389 A | 8/1985 | White | |
| 4,601,823 A | 7/1986 | Beck | |
| 4,605,498 A | 8/1986 | Kulish | |
| 4,606,775 A | 8/1986 | Robinson | |
| 4,683,072 A | 7/1987 | Holdt | |
| 4,692,335 A | 9/1987 | Iwanski | |
| 4,798,672 A * | 1/1989 | Knight | 210/282 |
| 4,822,512 A | 4/1989 | Auchincloss | |
| 4,824,565 A | 4/1989 | Middleton | |
| 4,865,760 A | 9/1989 | Johnson | |
| 4,923,426 A | 5/1990 | Klundt | |
| 4,961,872 A | 10/1990 | Sinclair | |
| 5,004,549 A | 4/1991 | Wood | |
| 5,009,806 A | 4/1991 | Johnson | |
| 5,049,385 A | 9/1991 | Wiedrich | |
| 5,106,559 A | 4/1992 | Wiedrich et al. | |
| 5,112,521 A | 5/1992 | Mullins | |
| 5,114,647 A | 5/1992 | Levesque | |
| 5,178,787 A | 1/1993 | Hung | |
| 5,205,961 A | 4/1993 | Shenefiel | |
| 5,318,328 A | 6/1994 | Dawson | |
| 5,320,751 A | 6/1994 | Burns | |
| 5,395,546 A | 3/1995 | Hung | |
| 5,407,598 A | 4/1995 | Olson | |
| 5,478,482 A | 12/1995 | Jones | |
| 5,514,287 A | 5/1996 | Jones | |
| 5,536,401 A | 7/1996 | Burns | |
| 5,565,576 A | 10/1996 | Hall | |
| 5,575,945 A | 11/1996 | Perlman | |
| 5,578,559 A | 11/1996 | Dolan | |
| 5,603,941 A | 2/1997 | Farina | |
| 5,637,230 A | 6/1997 | Billings | |
| 5,670,059 A | 9/1997 | Jones | |
| 5,741,520 A | 4/1998 | DeSenna | |
| 5,743,287 A | 4/1998 | Rauchwerger | |
| 5,750,061 A | 5/1998 | Farina | |
| 5,753,602 A | 5/1998 | Hung | |
| 5,755,330 A | 5/1998 | Siragusa | |
| 5,763,376 A | 6/1998 | Ward | |
| 5,817,337 A | 10/1998 | DeSenna | |
| 5,885,949 A | 3/1999 | Stamm | |
| 5,895,781 A | 4/1999 | Neumiller | |
| 5,910,475 A | 6/1999 | Neumiller | |
| 6,007,735 A | 12/1999 | Creed | |
| 6,019,905 A | 2/2000 | Waggoner | |
| 6,057,281 A | 5/2000 | Stamm | |
| 6,099,861 A | 8/2000 | DeSenna | |
| 6,121,215 A | 9/2000 | Rau | |
| 6,124,251 A | 9/2000 | Rader | |
| 6,136,768 A | 10/2000 | Dawson | |
| 6,153,120 A | 11/2000 | Scialla | |
| 6,164,332 A | 12/2000 | Hatton | |
| 6,165,505 A | 12/2000 | DeSenna | |
| 6,227,463 B1 | 5/2001 | Porter | |
| 6,235,127 B1 | 5/2001 | Rader | |
| 6,355,607 B1 | 3/2002 | Rahman | |
| 6,399,564 B1 | 6/2002 | Speed | |
| 6,440,915 B2 | 8/2002 | Rader | |
| 6,447,722 B1 | 9/2002 | Rakestraw | |
| 6,451,746 B1 | 9/2002 | Moore | |
| 6,544,487 B1 | 4/2003 | Ferguson | |
| 6,589,924 B2 | 7/2003 | Schmidt | |
| 6,593,417 B1 | 7/2003 | Anderson | |
| 6,713,441 B1 | 3/2004 | DeSenna | |
| 6,825,159 B2 | 11/2004 | Man | |
| 6,827,792 B2 | 12/2004 | Cervero | |
| 6,852,238 B2 | 2/2005 | Connelly, Jr. | |
| 6,863,830 B1 | 3/2005 | Purdy | |
| 6,951,286 B2 | 10/2005 | Mueller | |
| 6,969,527 B2 | 11/2005 | Brennan | |
| 6,984,398 B2 | 1/2006 | Brennan | |
| 6,995,129 B2 | 2/2006 | Olson | |
| 7,014,782 B2 | 3/2006 | D'Emidio | |
| 7,018,562 B2 | 3/2006 | Morioka | |
| 7,074,363 B2 | 7/2006 | Edmondson | |
| 7,135,436 B2 | 11/2006 | Van Vossen et al. | |
| 7,252,112 B1 | 8/2007 | Imler | |
| 7,285,522 B2 | 10/2007 | van Buskirk | |
| 7,309,444 B2 | 12/2007 | Connelly, Jr. | |
| 7,410,938 B2 | 8/2008 | Brennan | |
| 7,431,863 B2 | 10/2008 | Pickens | |
| 7,465,412 B2 | 12/2008 | Pickens | |
| 7,517,847 B2 | 4/2009 | Catalfamo | |
| 7,534,368 B2 | 5/2009 | Martin | |
| 7,625,496 B2 | 12/2009 | Rawat | |
| 7,753,079 B2 | 7/2010 | Nelson | |
| 7,762,438 B2 | 7/2010 | Skillin | |
| 7,780,857 B2 | 8/2010 | Rawat | |
| 7,927,510 B2 | 4/2011 | Mullins | |
| D654,146 S | 2/2012 | Bell et al. | |
| D654,147 S | 2/2012 | Bell et al. | |
| 8,647,567 B2 | 2/2014 | Rumberger et al. | |
| 2001/0003284 A1 | 6/2001 | Ito | |
| 2002/0004471 A1 | 1/2002 | Rader | |
| 2002/0028758 A1 | 3/2002 | Duncan | |
| 2002/0058605 A1 | 5/2002 | Schmidt | |
| 2002/0061831 A1 | 5/2002 | Kaziska | |
| 2002/0195404 A1 | 12/2002 | Pickens et al. | |
| 2003/0021819 A1 | 1/2003 | Khanna | |
| 2003/0104965 A1 | 6/2003 | Czuczak | |
| 2004/0043914 A1 | 3/2004 | Kaziska | |
| 2004/0157760 A1 | 8/2004 | Man | |
| 2004/0164029 A1 | 8/2004 | Souter | |
| 2004/0197395 A1 | 10/2004 | Brennan | |
| 2004/0214738 A1 | 10/2004 | Brennan | |
| 2004/0217326 A1 | 11/2004 | Souter | |
| 2005/0040116 A1 | 2/2005 | Purdy | |
| 2005/0072729 A1 * | 4/2005 | Bridges et al. | 210/469 |
| 2005/0113279 A1 | 5/2005 | Desmarescaux | |
| 2005/0173353 A1 | 8/2005 | Connelly, Jr. | |
| 2006/0040846 A1 | 2/2006 | Hoyt | |
| 2006/0076280 A1 | 4/2006 | Warren | |
| 2006/0093669 A1 | 5/2006 | Brennan | |
| 2006/0110453 A1 | 5/2006 | Brennan | |
| 2007/0125979 A1 | 6/2007 | Lei | |
| 2008/0004202 A1 | 1/2008 | Wolfgang | |
| 2008/0008621 A1 | 1/2008 | Ikeda | |
| 2008/0067468 A1 | 3/2008 | Pickens | |
| 2008/0073681 A1 | 3/2008 | Kanaya | |
| 2008/0083071 A1 | 4/2008 | Tremblay | |
| 2008/0107701 A1 | 5/2008 | Rawat | |
| 2008/0135062 A1 | 6/2008 | Hibbard | |
| 2008/0166365 A1 | 7/2008 | Ravetti | |
| 2008/0185323 A1 | 8/2008 | Kargenian | |
| 2008/0248989 A1 | 10/2008 | Holderbaum | |
| 2008/0258104 A1 | 10/2008 | Mullins | |
| 2008/0299161 A1 | 12/2008 | Sanderson | |
| 2009/0028965 A1 | 1/2009 | Healey | |
| 2009/0054289 A1 | 2/2009 | Dietsche | |
| 2009/0090661 A1 | 4/2009 | Tanner | |
| 2009/0148342 A1 | 6/2009 | Bromberg et al. | |
| 2009/0197787 A1 | 8/2009 | Venet | |
| 2009/0208547 A1 | 8/2009 | Martin | |
| 2009/0232903 A1 | 9/2009 | Sanderson | |
| 2010/0055203 A1 | 3/2010 | Rawat | |
| 2010/0140544 A1 | 6/2010 | Smith | |
| 2010/0183693 A1 | 7/2010 | Martin | |
| 2010/0249007 A1 | 9/2010 | Holderbaum | |

(56) References Cited

U.S. PATENT DOCUMENTS

| | | |
|---|---|---|
| 2010/0264361 A1 | 10/2010 | Rawat |
| 2010/0297320 A1 | 11/2010 | Branlard |
| 2010/0323083 A1 | 12/2010 | Rubinstenn |
| 2011/0027194 A1 | 2/2011 | Smith |
| 2011/0028368 A1 | 2/2011 | Smith |
| 2011/0044914 A1 | 2/2011 | Kohli |
| 2011/0052724 A1 | 3/2011 | Pickens et al. |
| 2011/0052726 A1 | 3/2011 | Smith |
| 2011/0059882 A1 | 3/2011 | Smith |
| 2011/0094972 A1 | 4/2011 | King |
| 2011/0142978 A1 | 6/2011 | Linossier |
| 2011/0233145 A1 | 9/2011 | Mullins |

FOREIGN PATENT DOCUMENTS

| | | |
|---|---|---|
| EP | 0824146 | 2/1998 |
| EP | 1600285 | 11/2005 |
| EP | 1953119 | 6/2008 |
| FR | 2870777 | 5/2004 |
| FR | 2865214 | 7/2005 |
| FR | 2872447 | 1/2006 |
| FR | 2883478 | 9/2006 |
| FR | 2926088 | 7/2009 |
| FR | 2939607 | 6/2010 |
| JP | 01254290 | 10/1989 |
| WO | WO91 03936 | 4/1991 |
| WO | WO99 92632 | 6/1999 |
| WO | WO99 61376 | 12/1999 |
| WO | WO01 09231 | 2/2001 |
| WO | WO01 09260 | 2/2001 |
| WO | WO01 49818 | 7/2001 |
| WO | WO2006 050477 | 5/2006 |
| WO | WO2006 097612 | 9/2006 |
| WO | WO2007 064681 | 6/2007 |
| WO | WO2007 065228 | 6/2007 |
| WO | WO2008 009804 | 1/2008 |
| WO | WO2008 073681 | 6/2008 |
| WO | WO2008 110172 | 9/2008 |
| WO | WO2008 130472 | 10/2008 |
| WO | WO2009 106476 | 9/2009 |
| WO | 2011062811 | 5/2011 |

OTHER PUBLICATIONS

International PCT Search Report; PCT/US2012/31452;The Clorox Company; Jul. 5, 2012.

International PCT Search Report; PCT/US2012/31466; The Clorox Company; Jun. 22, 2012.

NonFinal Office Action dated Jul. 22, 2014; U.S. Appl. No. 13/436,536, filed Mar. 30, 2012.

NonFinal Office Action dated Jul. 14, 2014; U.S. Appl. No. 13/427,701, filed Mar. 22, 2012.

* cited by examiner

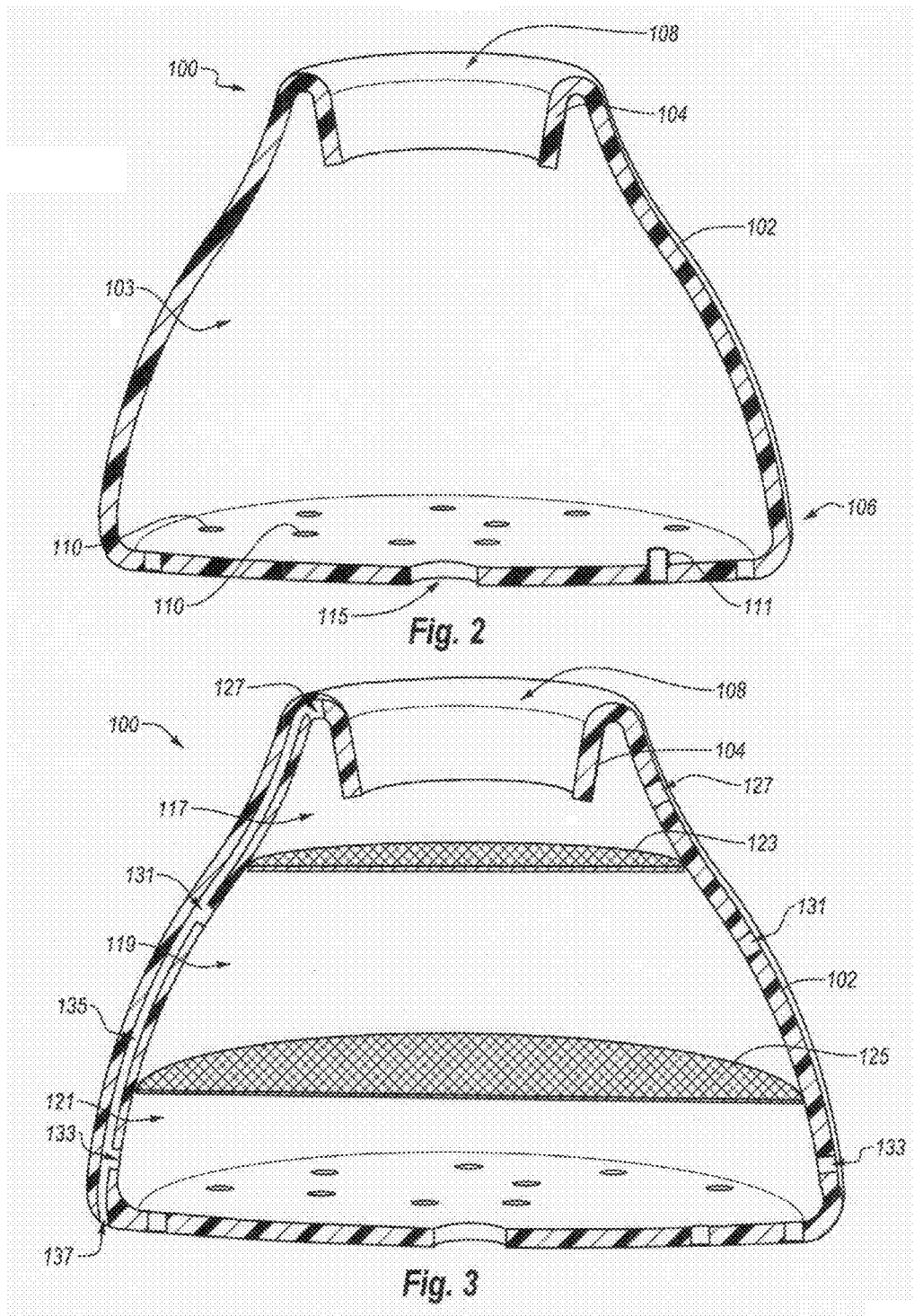

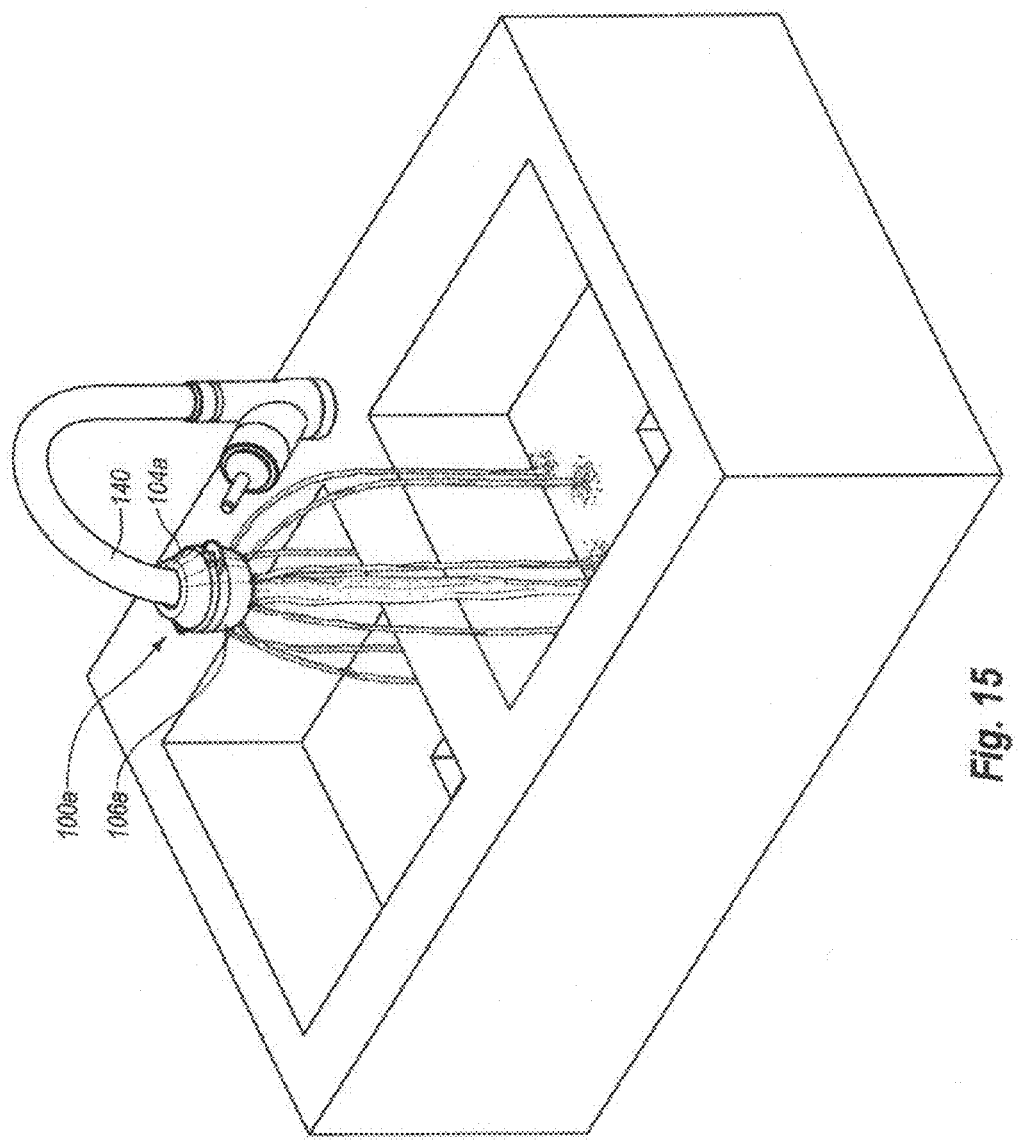

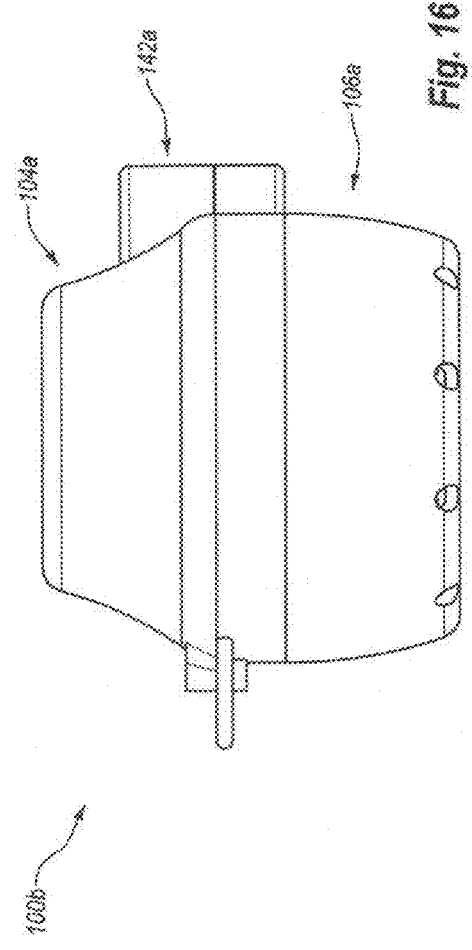
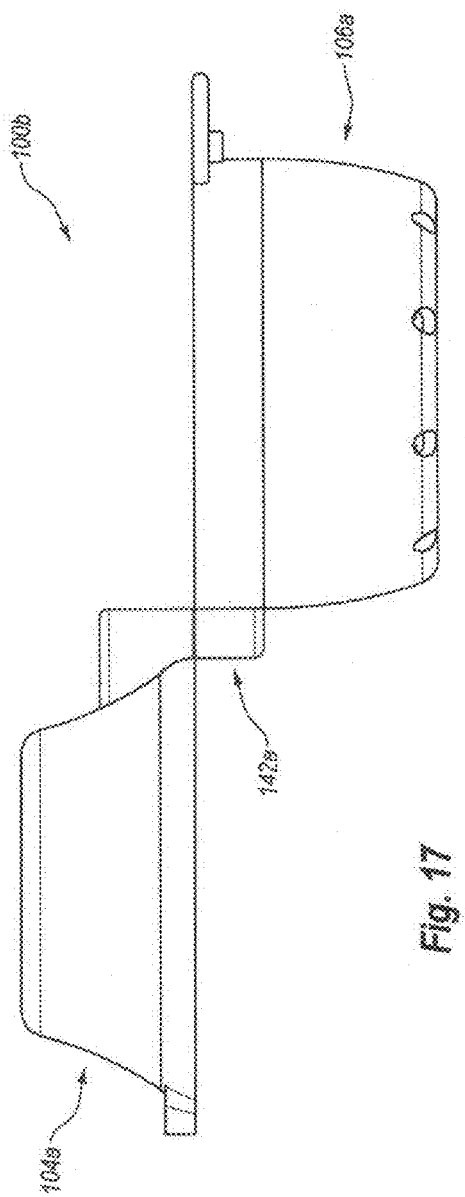

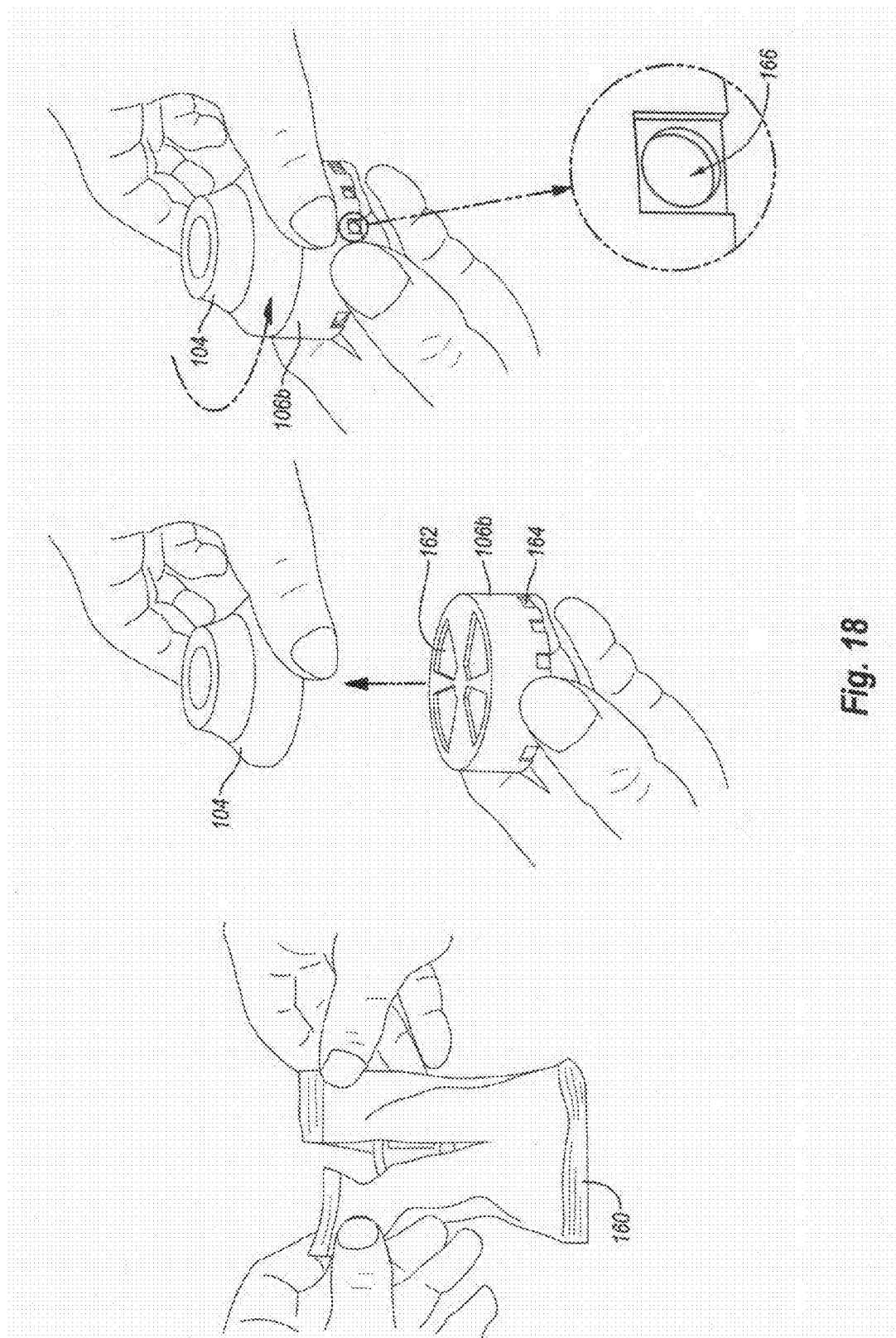

FAUCET MOUNTABLE WATER CONDITIONING DEVICES

CROSS REFERENCE TO RELATED APPLICATIONS

This application claims priority to and the benefit of U.S. Provisional Patent Application No. 61/472,423, filed Apr. 6, 2011, and entitled "FAUCET MOUNTABLE WATER CONDITIONING DEVICE." This application also claims priority to and the benefit of U.S. Provisional Patent Application No. 61/472,442, filed Apr. 6, 2011, and entitled "SHAPED COMPOSITIONS FOR UNIFORM DELIVERY OF A FUNCTIONAL AGENT." The disclosures of each of the above-referenced patent applications are hereby incorporated by reference in their entirety.

BACKGROUND OF THE INVENTION

1. The Field of the Invention

The present invention relates to water conditioning systems, and particularly to faucet mountable water conditioning devices.

2. Background and Relevant Art

Faucet-mounted water treatment devices have been in use for several years. Conventional faucet-mounted water treatment devices are often used to filter water in domestic applications, such as, in a kitchen or bathroom sink. Conventional faucet-mounted water treatment devices offer several advantages over other water treatment devices. Some of these advantages include relatively low cost and the ability to install the device at the source of water.

Unfortunately, many conventional faucet-mounted water treatment devices also have various drawbacks. For example, mounting and dismounting of conventional faucet-mounted water treatment devices can be difficult and time consuming. Furthermore, many conventional faucet-mounted water treatment devices are compatible with a limited number of faucet designs; and thus, require additional adaptors or relatively complicated installation procedures.

Additionally, many conventional faucet-mounted water treatment devices are relatively bulky. Due to their size, many conventional faucet-mounted water treatment devices limit space in the sink and otherwise interfere with domestic activities commonly conducted in the sink. In connection with their relatively bulky size, many conventional faucet-mounted water treatment devices are aesthetically unappealing.

In addition to the foregoing, many conventional faucet-mounted water treatment devices have a relatively complicated construction. Indeed, conventional faucet-mounted water treatment devices can include numerous complicated parts. Thus, many conventional faucet-mounted water treatment devices are relatively expensive to produce. Furthermore, many conventional faucet-mounted water treatment devices require the entire assembly to be disconnected from the faucet in order to replace the filter element.

Accordingly, there are a number of disadvantages in faucet-mounted water treatment devices that can be addressed.

BRIEF SUMMARY OF THE INVENTION

In accordance with the above objects and those that will be mentioned and will become apparent below, one aspect of the invention is a faucet mountable water conditioning device, comprising: a mounting mechanism defining an inlet, the mounting mechanism including an outer wall and an annular inner wall that tapers radially inward, wherein the annular inner wall comprises a resilient material and is configured to conform to, and seal about, a plurality of different sized faucets; a base coupled to the mounting mechanism, the base having a side wall and a bottom surface defining a compartment sized and configured to hold a water conditioning tablet; and one or more outlet holes extending through the bottom surface.

In accordance with the above objects and those that will be mentioned and will become apparent below, one aspect of the invention is a faucet mountable water conditioning device, comprising: a mounting mechanism defining an inlet for receiving a stream of water from a faucet, the mounting mechanism including an outer wall and an annular inner wall that tapers radially inward, wherein the annular inner wall comprises a resilient material and is configured to conform to, and seal about, a plurality of different sized faucets; a base having a side wall, a bottom surface, and one or more outlet holes extending through one or more of the side wall and bottom surface; and a connector coupling the base to the mounting mechanism, the connector being configured to allow the base move between an active position and an inactive position; wherein, in the active position, the base is positioned within a liquid flow path, and an inactive position, the base is positioned away from the liquid flow path.

Further features and advantages of the present invention will become apparent to those of ordinary skill in the art in view of the detailed description of preferred embodiments below.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 2 illustrates a cross-sectional view of the faucet mountable water conditioning device of FIG. 1, taken along the section line 2-2 of FIG. 1;

FIG. 3 illustrates a cross-sectional view of another implementation of a faucet mountable water conditioning device in accordance with one or more implementations of the present invention;

FIG. 15 illustrates a view of the faucet mountable water conditioning device of FIG. 7 secured to a faucet in an active position;

FIG. 16 illustrates a side view of yet another faucet mountable water conditioning device in accordance with one or more implementations of the present invention;

FIG. 17 illustrates a side view of the faucet mountable water conditioning device of FIG. 16 in which the base is rotated into an inactive position; and FIG. 18 illustrates a diagram showing a refill package and method of refilling a faucet mountable water conditioning device in accordance with one or more implementations of the present invention.

DETAILED DESCRIPTION OF THE PREFERRED EMBODIMENTS

Introduction

Figure 1:
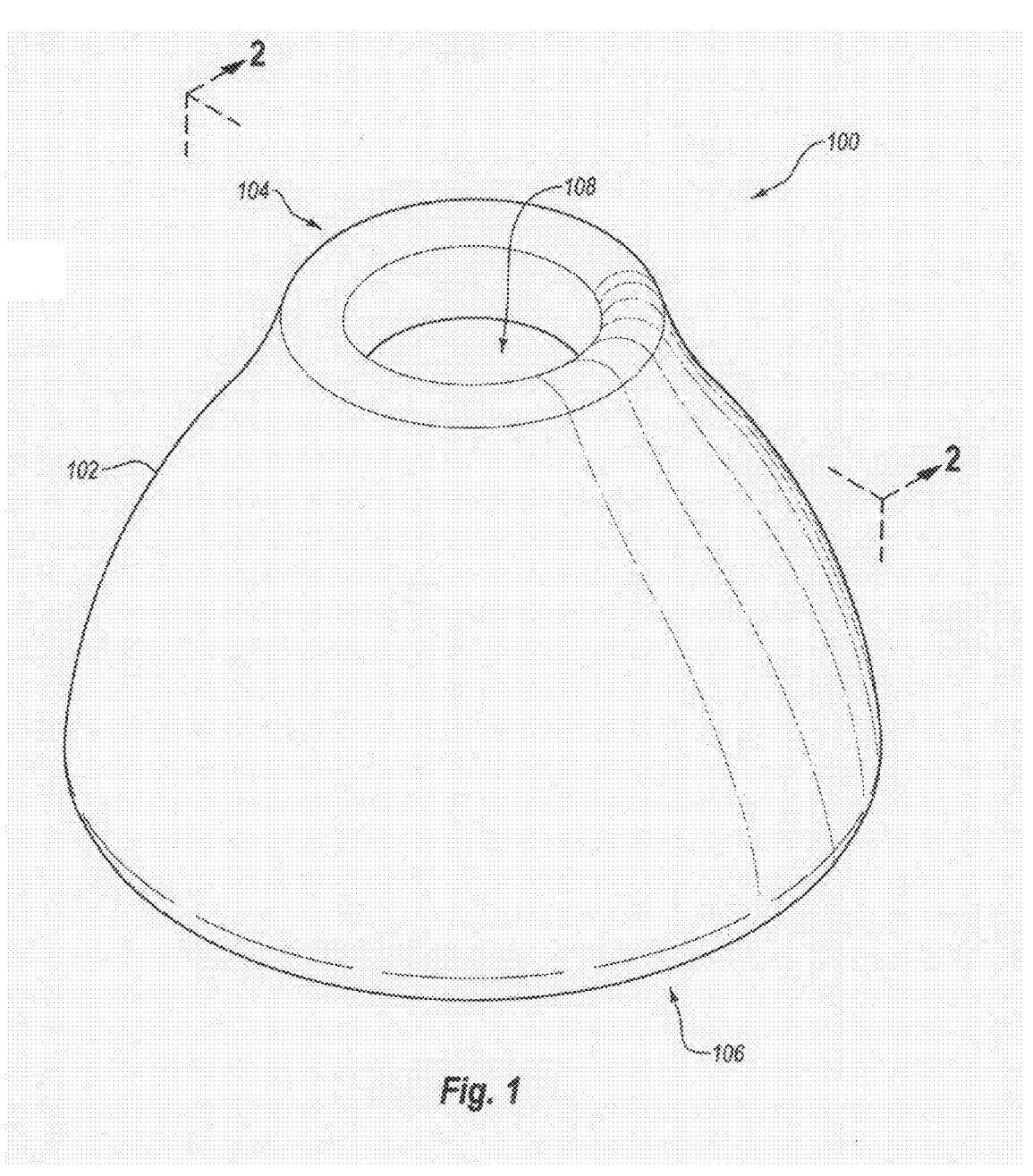
FIG. 1 illustrates a perspective view of a faucet mountable water conditioning device in accordance with one or more implementations of the present invention.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more such surfactants.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentage ("wt %'s") are in wt % (based on 100 weight % active) of the particular material present in the referenced composition, any remaining percentage being water or an aqueous carrier sufficient to account for 100% of the composition, unless otherwise noted.

General

Implementations of the present invention are directed to a faucet mountable water conditioning devices with relatively simple configurations that allow for reduced cost, easy installation and a pleasing aesthetic. In particular, one or more implementations of the present invention include faucet mountable water conditioning devices that a user can quickly and easily attach to a wide variety of different faucet designs. Additionally, one or more implementations include a faucet mountable water conditioning device with a relatively compact configuration that does not occupy large amounts of sink space.

As alluded to above, one or more implementations include a faucet mountable water conditioning device capable of attaching to a wide variety of different sized and/or shaped faucets. In particular, the faucet mountable water conditioning device can include a mounting mechanism having an inner tapered wall. The inner taper wall can comprise a resilient (e.g., elastomeric) material that allows the mounting mechanism to conform to, and seal about, various different sized and/or shaped faucets. Thus, a user can secure the faucet mountable water conditioning device to any of a number of different faucets by simply pressing the mounting mechanism about a faucet without having to thread the device to the faucet or use adaptors.

Additionally, one or more implementations include with a faucet mountable water conditioning device with a relatively simple configuration. In other words, the faucet mountable water conditioning device may not include complicated valves, fluid paths, or numerous parts. Indeed, in one or more implementations the faucet mountable water conditioning device can comprise a mounting mechanism and a base that define a generally hollow compartment sized and configured to hold a water conditioning source. The relatively simple configuration of the faucet mountable water conditioning device can reduce production costs thereby making the device affordable to larger numbers of consumers.

In addition the foregoing, one or more implementations can include a faucet mountable water conditioning device with a configuration that minimizes the sink space required by the device. For example, one or more implementations allow a user to move at least a portion of the faucet mountable water conditioning device into an inactive position that is out of the way of the sink. In particular, a connector can secure the mounting mechanism to the base. The connector can allow a user to rotate, flip, or swing at least the base of the faucet mountable water conditioning device out of the useable area of the sink when not in use.

Referring now to the Figures, FIGS. 1 and 2 illustrate perspective and cross-sectional views, respectively, of a faucet mountable water conditioning device 100 in accordance with an implementation of the present invention. The faucet mountable water conditioning device 100 can include a housing 102. The housing 102 can include an upper portion or mounting mechanism 104 and a lower portion or base 106.

The mounting mechanism 104 can allow the faucet mountable water conditioning device 100 to be removably attached to a wide variety of faucet designs in a quick and efficient manner, as explained in greater detail below. Furthermore, the mounting mechanism 104 can effectively seal the faucet mountable water conditioning device 100 to a faucet. Thus, the mounting mechanism 104 can provide a secure and universal attachment to a faucet. The mounting mechanism 104 can define an inlet 108 to the faucet mountable water conditioning device 100. In other words, when the mounting mechanism is secured to a faucet, water can exit the faucet and pass through the mounting mechanism 104 into the housing 102.

Referring to FIG. 2, the housing 102 of faucet mountable water conditioning device 100 can define a compartment 103. The compartment 103 can comprise a generally hollow interior space. The compartment 103 can have a size and configuration to hold a water conditioning source. In one or more implementations, the water conditioning source can comprise a tablet, as explained in greater detail below. In another implementation, the water conditioning source can comprise a liquid.

The base 106 of the faucet mountable water conditioning device 100 can include one or more outlet holes 110. The outlet holes 110 can allow water to pass out of the faucet mountable water conditioning device 100. In particular, water can flow into the faucet mountable water conditioning device 100 through the inlet 108, flow about a water conditioning source within the compartment 103, and flow out of the outlet holes 110 as conditioned water.

The outlet holes 110 can have a size, shape, and/or location to deliver the desired flow of conditioned water from faucet mountable water conditioning device 100. For example, as illustrated by FIG. 3, the outlet holes 110 may be cylindrical. Additionally or alternatively, the outlet holes 110 may have a conical or other shape. For example, the outlet holes can further include elongated slots that extend about the base 106.

In one or more implementations, one or more outlet holes 110 can include an extension 111 that extends from base 106 either into compartment 103 or downward away from compartment 103. The extensions 111 can help control how much water flows out of the faucet mountable water conditioning device 100. Furthermore, the extensions 111 can direct water exiting the faucet mountable water conditioning device 100 as desired. In one or more implementations, each outlet hole 110 can include an extension 111. In alternative implementations, none of the outlet holes 110 include an extension 111. In still further implementations, some, but not all, of the outlet holes 110 include extensions 111.

The base 106 may optionally contain one or more outlet holes having a size, configuration, and/or location so as to help drain residual conditioned water from compartment 103 after water flow has ceased. For example, FIG. 2 illustrates that the base 106 can include one or more centrally located outlet holes 115 having a larger diameter than outlet holes 110. Furthermore, in one or more implementations the outlet holes 115 can be recessed into the base 106 or located at the lowest point on the base 106.

Referring now to FIG. 3, in one or more implementations, the compartment 103 can be subdivided into two or more chambers. FIG. 3 depicts compartment 103 subdivided into three chambers; an upper chamber 117, a main chamber 119, and a lower chamber 121. In alternative implementations, the compartment 103 can comprise a single chamber, two chambers, or more than three chambers. In any event, in one or more implementations one or more inserts can divide the compartment 103. For example, FIG. 3 illustrates that an insert 123 can divide the upper chamber 117 from main chamber 119. Along similar lines, an insert 125 can optionally divide the lower chamber 121 from main chamber 119.

In one or more implementations, the insert 123 is proximate to the mounting mechanism 104. A location proximate the mounting mechanism 104 can allow the insert 123 to serve several purposes including, but not limited to, preventing over insertion of a faucet into mounting mechanism 104, preventing contact with water conditioning source through inlet 108, preventing water conditioning source from falling out of faucet mountable water conditioning device 100 through inlet 108 when the faucet mountable water conditioning device 100 is removed from faucet or flipped out of the way during non-use, controlling flow from the faucet into main chamber 119, and/or helping to direct flow from inlet 108 into main chamber 119. Alternatively, the insert 123 can be distal to the mounting mechanism 104.

In one or more implementations, the insert 123 comprises a filter, a mesh, or a fibrous mat. In such implementations, the insert 123 can filter or otherwise prevent passage of certain materials (i.e., pollutants, dirt, debris, chemicals) into or out of the main chamber 119 while allowing water or other materials to flow into the main chamber 119. In still further implementations, the insert 123 can comprise a plastic or rubber grill (similar to grill 156 described below in relation to FIG. 10). In any event, the insert 123 can serve one or more of the foregoing or other purposes.

As previously mentioned, the faucet mountable water conditioning device 100 can include an insert 125 that divides the lower chamber 121 from the main chamber 119. In one or more implementations, the water conditioning source is located in main chamber 119. In such implementations, insert 125 can serve one or more of several purposes, including but not limited to, controlling flow around water conditioning source located in main chamber 119, controlling flow into lower chamber 121, controlling the flow through outlet holes 110, preventing contact of water conditioning source with the base 106 or outlet holes 110, or preventing large particulates from the water conditioning source from exiting the faucet mountable water conditioning device 100 through outlet holes 110.

In one or more implementations, the insert 125 comprises a filter, a mesh, or a fibrous mat. In such implementations, the insert 125 can filter or otherwise prevent passage of certain materials (i.e., pollutants, dirt, debris, chemicals) out of the main chamber 119 while allowing water or other materials to flow out of the main chamber 119. In still further implementations, the insert 125 can comprise a plastic or rubber grill (similar to grill 156 described below in relation to FIG. 10). In any event, the insert 125 can serve one or more of the foregoing or other purposes.

The body 102 can include one or more grooves extending radially on an interior surface thereof. The grooves can support the inserts 123, 125 and prevent them from moving relative to the body 102. Alternatively, the body 102 can include one or more inwardly extending pegs (similar to pegs 158 described below) that support and/or prevent movement of the inserts 123, 125 relative to the body 102. In yet further implementations, the inserts 123, 125 can be coupled to the water conditioning source or a frame supporting the water conditioning source.

In one or more implementations, it may be desirable that faucet mountable water conditioning device 100 does not retain water (or a certain amount of water) in the compartment 103 after the flow of water entering faucet mountable water conditioning device 100 through inlet 108 is discontinued by shutting off the faucet. One will appreciate that the outlet holes 110, 115, and optionally the extensions 111 can help drain residual conditioned water from compartment 103 after water flow has ceased.

Furthermore, the compartment 103 may include vents through housing 102 to provide a passage way for air to enter into or exit from the compartment 103 to minimize the potential for airlocks to retain water in any of the chambers 117, 119, or 121 of the compartment 103. For example, FIG. 3 depicts optional vents 127 in upper chamber 117, optional vents 131 in main chamber 119, and optional vents 133 in lower chamber 121. It should be recognized that each of the chambers may or may not contain vents. Furthermore, the vents 127, 131, 133 can have a size and/or and location in the housing 102, or alternatively in mounting mechanism 104, to vent air from the respective chambers while minimizing the flow of water through said vents.

In one or more implementations, the housing includes a channel 135 that connects one or more of the vents 127, 131, 133. The channel 135 can comprise a hose or other device positioned against an outer surface of the housing 102. In alternative implementations, the channel 135 is integrally formed in the wall of the housing 102 as shown in FIG. 3. The channel 135 can include an exit 137 proximate the base 106. The channel 125 and exit 137 can allow any water that may be forced into vents 127, 131, 133 during use to exit the faucet mountable water conditioning device 100 in a direction down into the sink rather than spraying out laterally. In alternative implementations, the exit 137 connects to an outlet hole 110 in the base 106. In still further implementations, the exit 137 is located proximate the mounting mechanism 104 or between the base 106 and the mounting mechanism 104.

Figure 4:
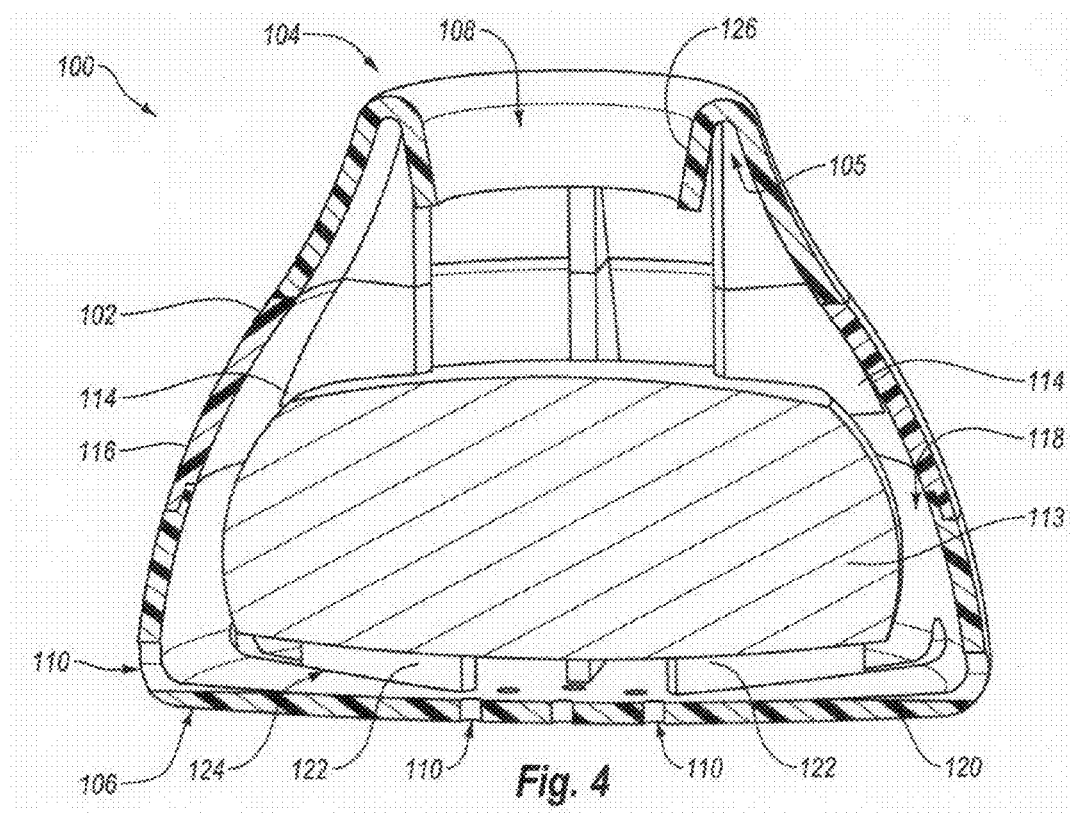
FIG. 4 illustrates a cross-sectional view of yet another implementation of a faucet mountable water conditioning device in accordance with one or more implementations of the present invention.
Figure 5:
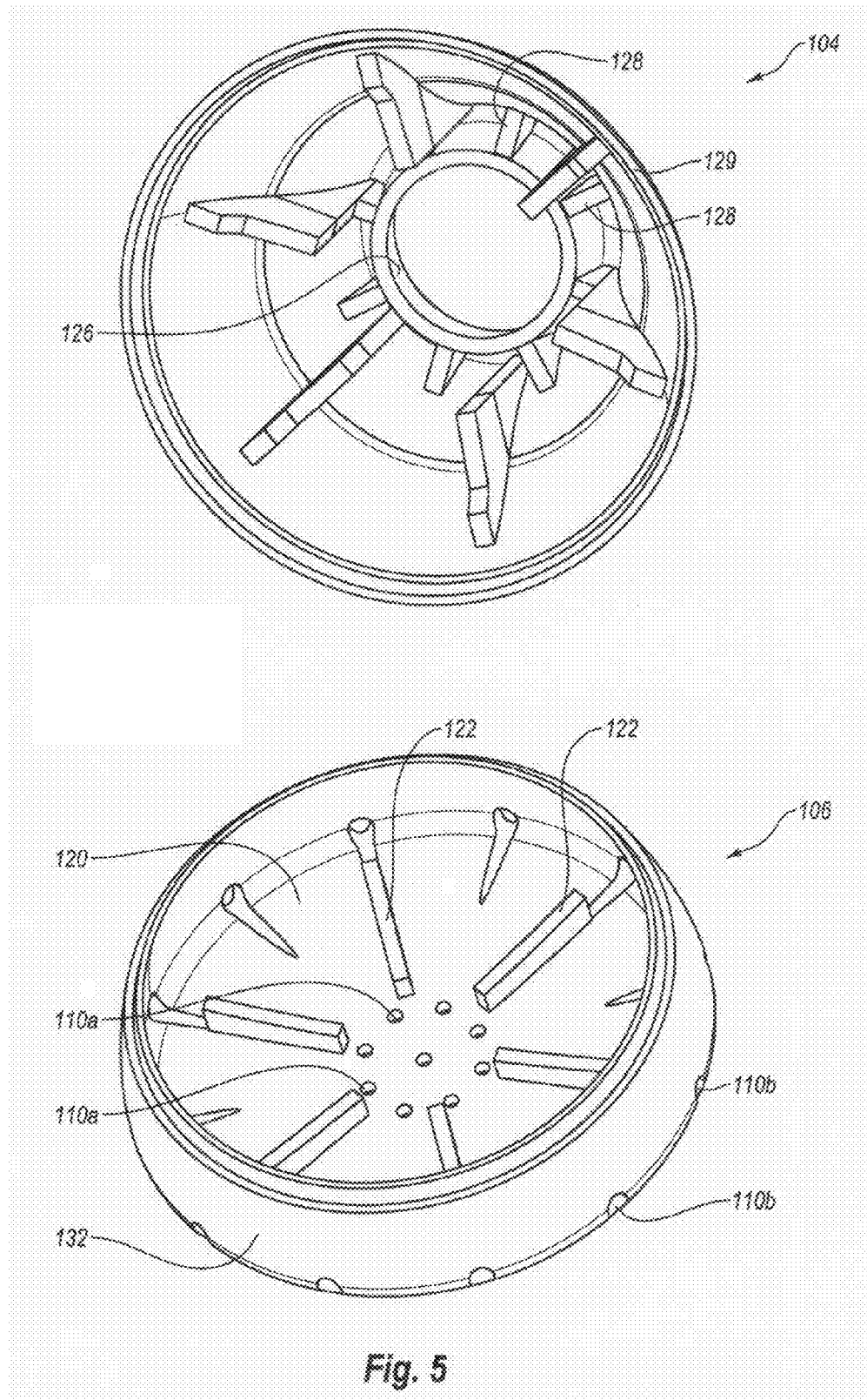
FIG. 5 illustrates an exploded interior view of the faucet mountable water conditioning device of FIG. 4.

In one or more implementations, the base 106 can be removably coupled to the mounting mechanism 104. For example, FIGS. 4 and 5 illustrate a faucet mountable water conditioning device 100 in which the base 106 is removably coupled to the mounting mechanism 104. For example, the base 106 and a bottom portion 112 of the mounting mechanism 104 can have a snap-fit configuration. Thus, a lip 114 of the base 106 can snap into the bottom portion 112. In alternative implementations, the base 106 and the bottom portion 112 can include a bayonet fitting or be correspondingly threaded. In any event, the ability to remove the base 106 from the mounting mechanism 104 can allow a user to replace the water conditioning source without having to dismount the mounting mechanism 104 from the faucet. In yet further implementations, the base 106 and mounting mechanism 104 can all be a single integral piece. In any event, one or more of the parts of the faucet mountable water conditioning device 100 can comprise injection molded components. One will appreciate in light of the disclosure herein injection molding can reduce the cost of the components of the faucet mountable water conditioning device 100.

As shown by FIG. 4, the housing 102 can broaden as it extends from the mounting mechanism 104 to the base 106. In other words, the base 106 can be broader and have a larger area than the inlet 108 defined by the mounting mechanism 104. The broad shape of the housing 102 can reduce the extent to which the faucet mountable water conditioning device 100 extends into a sink. Furthermore, the broad shape of the housing 102 can allow for larger sized water conditioning sources without the requiring the faucet mountable water conditioning device 100 to extend further into the useable area of a sink.

FIG. 4 further illustrates that the housing 102 can be configured to hold a water conditioning source. For example, the housing 102 can define a generally hollow compartment sized and configured to hold a water conditioning source. As shown by FIG. 3, in one or more implementations the water conditioning source can comprise a tablet 113.

Water can flow into the faucet mountable water conditioning device 100 through the inlet 108. Water entering the faucet mountable water conditioning device 100 can flow about the water conditioning source 113, and out of the outlet holes 110 in the base 106. As the water flows about the water conditioning source 113, active components of the water conditioning source 113 can dissolve into the water. One will appreciate in light of the disclosure herein that the water conditioning source 113 can comprise any number of active components that allow a user to condition water in any number of different ways.

For example, in one or more implementations the water conditioning device 112 can comprise a hypochlorite tablet. The hypochlorite tablet can convert regular tap water into a mild sanitizing solution that kills 99.9% of germs. A hypochlorite tablet can allow a user to rinse items like lettuce, strawberries, and other food items to kill any germs that may cause food borne illnesses. Additionally, a hypochlorite tablet can allow for rinsing of sponges, cutting boards, utensils, child cups or anything else a user may be concerned has hidden germs. Thus, the faucet mountable water conditioning device 100 can act as a versatile, seamless sanitizing rinse during the food preparation process.

In alternative implementations the active component(s) of the water conditioning source 113 can comprise a disinfecting kitchen cleaner, soap, or hand wash. Such a water conditioning source 113 can combine with tap water to form a cleaning solution for the kitchen or elsewhere. The convenient placement of the faucet mountable water conditioning device on a faucet can allow a user access to a disinfecting kitchen cleaner quickly and efficiently. In further implementations the active component(s) of the water conditioning source 113 can comprise a concentrated cleaner, such as PINE-SOL or a concentrated drain cleaner, such as LIQUID-PLUMR.

Alternatively, the active component(s) of the water conditioning source 113 can comprise a concentrated flavor or health drink that allows one to turn tap water into flavored water. In still further implementations, the water conditioning source 113 can comprise a water filtering device, such as a BRITA filter, that allows a user to filter tap water easily and conveniently. Thus, one will appreciate that the water conditioning source 113 can comprise any number of different active components to condition tap water in any number of different ways.

In any event, in one or more implementations the housing 102 can include one or more features that ensure that water can flow about the water conditioning source 113 to the outlet holes 110. For example, the housing 102 can include one or more flanges or side spacers 114 extending from the side wall 116 of the housing 102. The side spacers 114 can provide a gap 118 between the side wall 114 and the water conditioning source 113. In particular, FIG. 4 illustrates that a plurality of side spacers 114 can extend radially inward from the inner surface of the side wall 114. The side spacers 114 can extend from inner surface of the mounting mechanism 104 as shown in FIG. 4. Alternatively, or additionally, the side spacers 114 can extend from the inner surface of the base 106. In any event, the side spacers 114, and the gap 118 created thereby, can allow water to flow from the inlet 108 about the sides of the water conditioning device to the outlet holes 110.

In addition to the side spacers 114, in one or more implementations the housing 102 can include one or more features to space the water conditioning source 113 from the bottom surface 120 of the base 106. For example, FIG. 4 illustrates that the housing 102 can include a plurality of flanges or bottom spacers 122 extending upward from the bottom surface 120 of the base 106. The bottom spacers 122 can provide a gap 124 between the bottom surface 120 and the water conditioning source 113, allowing water to reach the outlet holes 110 in the bottom surface 120.

As previously mentioned, the mounting mechanism 104 can allow a user to secure the faucet mountable water conditioning device 100 to a wide variety of faucets or other devices (i.e., hose, spigot). As shown by FIG. 4, the mounting mechanism 104 can include an inner tapered wall 126. The inner tapered wall 126 can extend toward the base 106 and taper generally radially inward. The inner tapered wall 126 can comprise a resilient material that allows the inner tapered wall 126 to conform to a faucet or other object placed therein. The inner tapered wall 126 can allow a user to push the mounting mechanism 104 onto faucets with different sizes and shapes. The resilient material of the inner tapered wall 126 can allow the mounting mechanism 104 to conform to, and seal about, a faucet as explained in greater detail below in relation to FIGS. 11A and 11B.

In one or more implementations, the inner tapered wall 126 (and optionally the entire mounting mechanism 104) can comprise rubber (natural or synthetic), a thermoplastic elastomer (TPE), a thermoplastic polyurethane (TPU), acrylonitrile butadiene styrene (ABS), urethane, polypropylene, combinations thereof, or other resilient materials. In addition to allowing the inner tapered wall 126 to universally couple and seal to a wide variety of faucets, the material of the inner tapered wall 126 can also help prevent the faucet mountable water conditioning device 100 from scratching or otherwise damaging a faucet.

One will appreciate in light of the disclosure herein that the inner tapered wall 126 can have a shape corresponding to the shape of one or more faucets. For example, FIGS. 4 and 5 illustrate that in one or more implementations the inner tapered wall 126 can have an annular shape. The annular shape of the inner tapered wall 126 can allow the mounting mechanism to attach to circular type faucets. In alternative implementations, the inner tapered wall 126 have a wide variety of different shapes, such as, for example, square, oval, or more complex shapes.

As shown by FIGS. 4 and 5, in one or more implementations, the inner tapered wall 126 of the mounting mechanism 104 is devoid of threads. Thus, to mount the faucet mountable water conditioning device 100, a user need not remove an aerator, thread the device to the faucet, use an adaptor, or otherwise require complicated installation procedures. Indeed, in order to install the faucet mountable water conditioning device 100, a user need only push the mounting mechanism 104 about a faucet. The resilient material of the mounting mechanism 104 can then conform to, and seal about, the faucet.

FIG. 5 illustrates that in one or more implementations the mounting mechanism 104 can include ribs 128 extending between the inner tapered wall 126 and an outer wall 129 of the mounting mechanism 104. The ribs 128 can provide support to the inner tapered wall 126. Thus, the ribs 128 can help ensure that the inner tapered wall 126 seals against a faucet. In one or more implementations the inclusion of the ribs 128 can be based at least in part on the material used to form the mounting mechanism 104. For example, ribs 128 may be present when the mounting mechanism 104 comprises a softer material (e.g., urethane) to provide additional support and strength. Alternatively, mounting mechanism 104 may not include ribs 128 when formed from a more rigid material (e.g., polyurethane).

When attached to a faucet, the inner tapered wall 126 can press against the faucet, which can force the inner tapered wall 126 into a substantially vertical configuration. The substantially vertical configuration of the inner tapered wall 126 can allow the inner tapered wall 126 to create a seal with the faucet. Furthermore, the substantially vertical configuration of the inner tapered wall 126 can provide the faucet mountable water conditioning device 100 with lateral stability such that the faucet mountable water conditioning device 100 cannot be easily moved laterally relative to the faucet.

As shown in FIG. 4, the base 106 can include a side wall 132 extending about the bottom surface 120. The base 106 can have a size and configuration that allows the base 106 to hold a water conditioning source. One will appreciate in light of the disclosure herein that the base 106 can comprise any number of various different shapes and sizes. For example, FIG. 4 illustrates that the bottom surface 120 has a planar, circular configuration.

In alternative implementations, the bottom surface 120 can have a square, rectangular, oval, or other shape. Furthermore, the bottom surface 120 need not be planar. For example, in one or more implementations, the bottom surface can have a concave configuration. When the bottom surface is concave, bottom spacers 122 may not be need to space a water conditioning source from the outlet holes 110, as the curvature of the bottom surface 120 can do so. The bottom spacers are configured to prevent the water conditioning tablet from covering one or more outlet holes extending through the bottom surface and to allow the tablet not to contact standing water when the faucet is turned off.

Additionally, FIG. 4 illustrates that the base 106 does not include side spacers (i.e., flanges extending from the side wall 132). In alternative implementations, the base 106 can include side spacers extending from the side wall 132. Such side spacers can provide the water conditioning source 113 from contacting the side wall 132 and preventing the passage of water between the side wall 132 and the water conditioning source 113.

As alluded to earlier, in one or more implementations, the base 106 can be broader or wider than the inlet 108 defined by the mounting mechanism 104. In other words, the surface area of the bottom surface 120 can be larger than the surface area or size of the inlet 108. Furthermore, while the Figures illustrate both the inlet 108 and the bottom surface 120 having circular configurations, the present invention is not so limited. For example, in alternative implementations, the shape of the bottom surface 120 can differ from the shape of the inlet 108.

The base 106 can comprise a high strength, light weight material. For example, the base 106 can comprise a polymeric material, such as polycarbonate, polypropylene, polystyrene, ABS. Alternatively, the base 106 can comprise fiber glass, glass, or another suitable material. In one or more implementations, the base 106 can comprise a transparent or translucent material. Alternatively, at least a portion of the base 106 (i.e., a window) may be transparent. The transparency of the base 106 (or a portion thereof) can allow a user to see the water conditioning source 113 stored therein. Thus, in one or more implementations the transparency of the base 106 can eliminate the need for a metering device or other signal that indicates the water conditioning source 113 needs replacement.

As previously mentioned, the base 106 can include one or more outlet holes. For example, in one or more implementation the base 106 includes a plurality of center outlet holes 110a extending through the bottom surface 120. Additionally, the base 106 can include a plurality of peripheral outlet holes 110b located about the periphery of the bottom surface 120 of the base 106, or even the side wall 132 of the base 106.

In one or more implementations, the outlet holes 110a, 110b have a substantially uniform arrangement to provide a substantially uniform water spray pattern upon discharge of water through the faucet mountable water conditioning device 100. As will be appreciated in light of the disclosure herein, the outlet holes 110a, 110b may comprise various configurations and/or orientations to achieve various different water spray patterns. Furthermore, the base 106 can include one or more blocking devices (i.e., a disc with holes positioned adjacent, or in, the bottom surface 120) that cover different outlet holes 110a, 110b when rotated between different positions.

Such blocking devices can allow a user to vary the configuration of the flow exiting the base 106. For example, in one or more implementations such a blocking device can cover only the peripheral outlet holes 110b in a first position and can cover only the center outlet holes 110a in a second position. Thus, a blocking device can allow a user to choose between a shower spray pattern and a center spray pattern.

Figure 6:
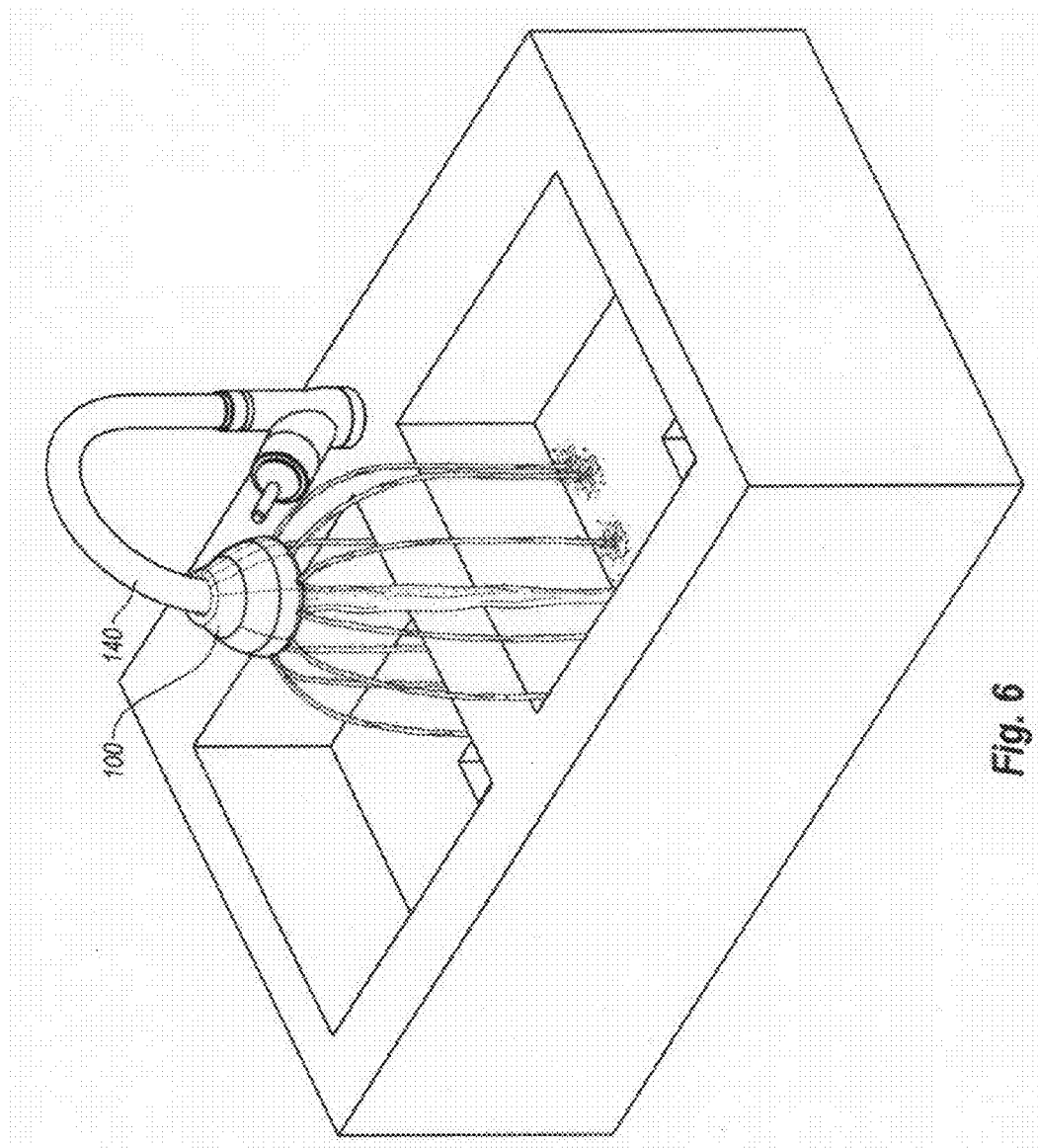
FIG. 6 illustrates a perspective view of the faucet mountable water condition device of FIG. 1 secured to a faucet.

FIG. 6 illustrates a view of the faucet mountable water conditioning device 100 secured to a faucet 140. As shown by FIG. 6, the outlet holes 110a, 110b can provide a shower spray, including central flow. Furthermore, FIG. 6 illustrates that in one or more implementations the faucet mountable water conditioning device 100 can increase the area of the flow exiting the faucet 140. For example, the faucet mountable water conditioning device 100 can direct some or all of the water exiting the faucet 140 laterally outward so that the flow pattern of the exiting water is wider than a cup or glass. One will appreciate that this can discourage a user from drinking conditioned water exiting the faucet mountable water conditioning device 100.

The outlet holes 110a, 110b in connection with the in-line configuration of the base 106 with the inlet 108 defined by the mounting mechanism 104 can allow water to flow substantially unrestricted from the faucet 140 through the faucet mountable water conditioning device 100. Additionally, in one or more implementations the faucet mountable water conditioning device 100 can be pressurized such that the device accelerates the water or other fluid as it passes there through. When faucet mountable water conditioning device 100 is pressurized, the pressure produced in device 100 can cause a pressure to be produced in void 105 (see FIG. 4) between inner tapered wall 126 and outer wall 129. The pressure in void 105 can cause a pressure to be exerted on the inner tapered wall 126 causing inner tapered wall 126 to be forced against faucet 140 thus aiding in sealing inner tapered wall 126 against faucet 140. One will appreciate that this can aid in rinsing or cleansing items using water conditioned using the faucet mountable water conditioning device 100.

One will appreciate in light of the disclosure herein that faucet mountable water conditioning devices in accordance with the present invention are not limited to the particular implementation shown above. For example, FIGS. 7-15 illustrate various view of another faucet mountable water conditioning device 100a. The faucet mountable water conditioning device 100a includes a mounting mechanism 104a and base 106a similar to the mounting mechanism 104 and base 106 described hereinabove in reference to FIGS. 1-6.

While not all included for the sake of brevity, the features and description of the mounting mechanism 104 and base 106 provided above also apply to the mounting mechanism 104a and base 106a. In contrast to the faucet mountable water conditioning device 100, however, the faucet mountable water conditioning device 100a includes a connector. As explained in greater detail below, the connector can allow the faucet mountable water conditioning device 100a to move between an active position and an inactive position.

Figure 7:
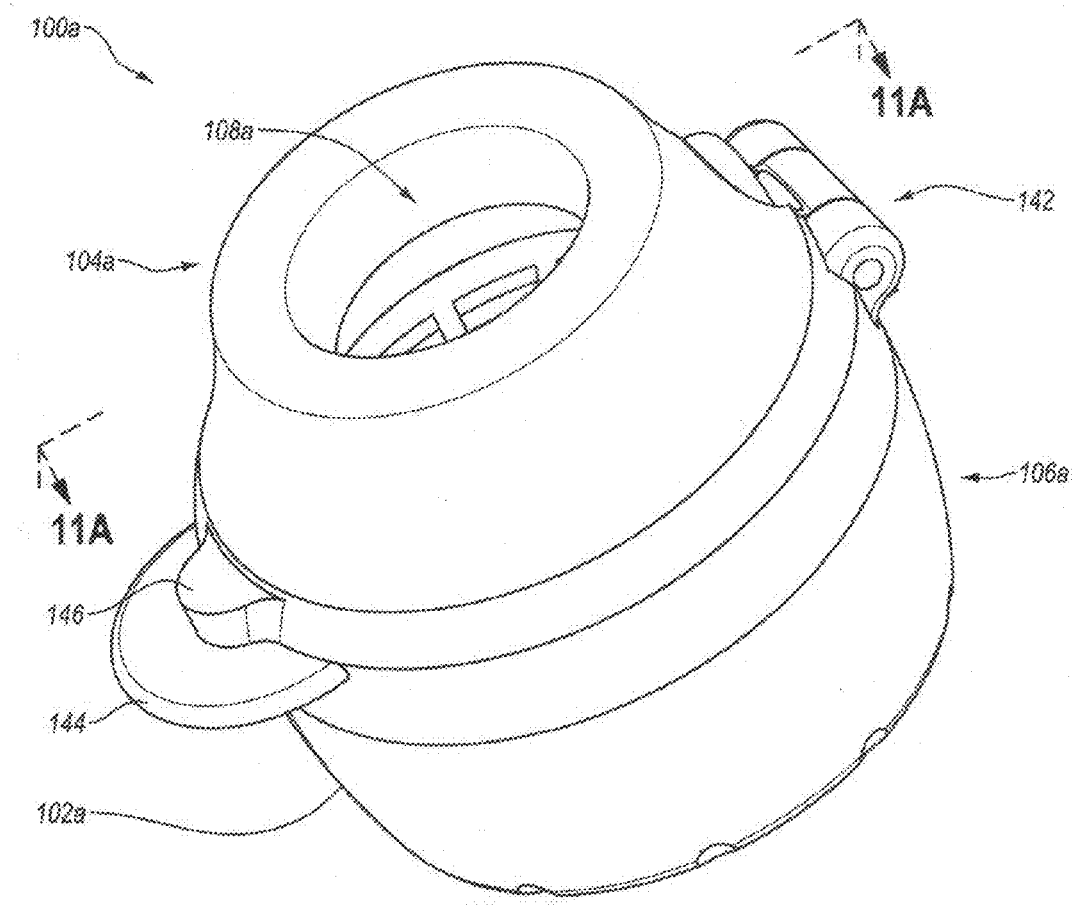
FIG. 7 illustrates a perspective view of another faucet mountable water conditioning device in accordance with one or more implementations of the present invention.
Figure 8:
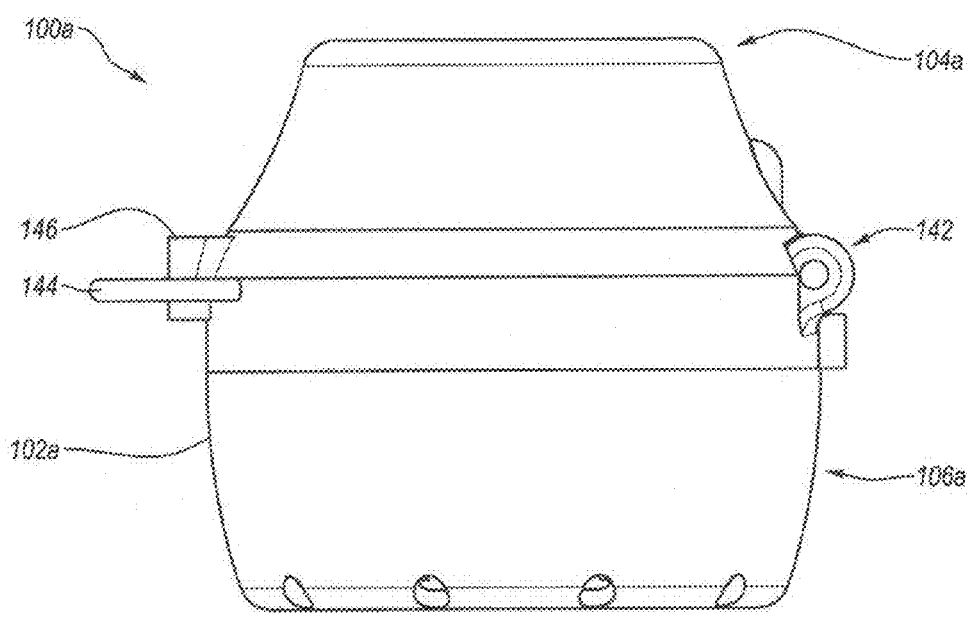
FIG. 8 illustrates a side view of the faucet mountable water conditioning device of FIG. 7.

FIGS. 7 and 8 illustrate perspective and side views, respectively, of the faucet mountable water conditioning device 100a. The faucet mountable water conditioning device 100a can include a housing 102a. The mounting mechanism 104a and the base 106a can form the housing 102a. The mounting mechanism 104a can allow the faucet mountable water conditioning device 100a to be removably attached to a wide variety of faucet designs in a quick and efficient manner, as explained above. Furthermore, the mounting mechanism 104a can effectively seal the faucet mountable water conditioning device 100a to a faucet. Additionally, the mounting mechanism 104a can have an annular shape and define an inlet 108a to the faucet mountable water conditioning device 100a.

As shown by FIGS. 7 and 8, the mounting mechanism 104a can allow the base 106a to be mounted directly below the outlet of a faucet. In other words, the faucet mountable water conditioning device 100a can ensure that the base 106a (and a water conditioning source therein) is directly in line with water exiting a faucet. The in-line configuration of the faucet mountable water conditioning device 100a can help ensure the flow of the water is not significantly reduced as it passes through the faucet mountable water conditioning device 100a.

In one or more implementations the faucet mountable water conditioning device 100a can allow the base 106a (and a water conditioning source therein) to be moved out of an in-line configuration. Thus, the faucet mountable water conditioning device 100a can be articulated from a position in which the base 106a is in-line with the faucet and a position in which the base 106a is moved out of line relative to the mounting mechanism 104a (and thus the faucet). For example, a connector 142 can couple the base 106a to the mounting mechanism 104a.

Figure 9:
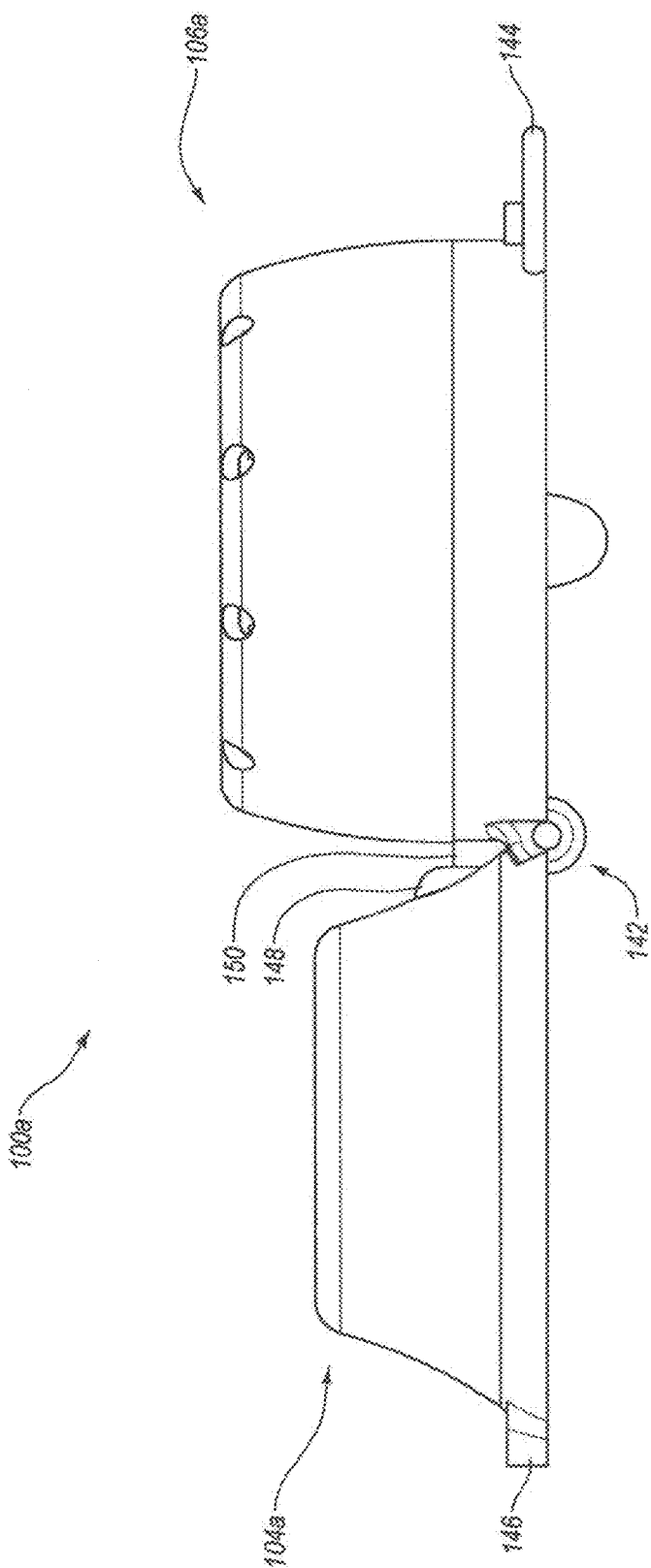
FIG. 9 illustrates a side view of the faucet mountable water conditioning device of FIG. 7 in which the base is moved into an inactive position adjacent the mounting mechanism.

As shown by FIGS. 7-9, in one or more implementations the connector 142 can comprise a generally horizontally extending pivot pin or hinge (e.g., a living hinge). As a comparison of FIGS. 8 and 9 illustrate, the connector 142 can allow the base 106a to rotate about a generally horizontal axis between an active position (FIG. 8), in which the base 106a is below and in line with the mounting mechanism 104a, and an inactive position (FIG. 9), in which the base 106a is out of alignment with the mounting mechanism 104a. In particular, in one or more implementations the connector 142 can allow the base 106a to flip away from the mounting mechanism 104a in to an inactive position in which the base 106a is vertically adjacent the mounting mechanism 104a. In alternative implementations, the connector 142 can comprise a track, swivel, or other mechanism that allows the base 106a to swivel or rotate away from an in-line configuration with the mounting mechanism 104a (and a faucet attached thereto).

In any event, one will appreciate in light of the disclosure herein that the ability to move (i.e., rotate, slide, or flip) the base 106a away from the mounting mechanism 104a can provide a number of advantages. In particular, the ability to flip the base 106a away from the mounting mechanism 104a can allow a user access to the base 106a without having to completely dismount the faucet mountable water conditioning device 100a. Thus, a user can replace or exchange a water conditioning source within the base 106a without having to dismount the faucet mountable water conditioning device 100a from the faucet.

The faucet mountable water conditioning device 100a can further include a tab 144. The tab 144 can provide a point of engagement that allows the user to quickly flip the base 106a between the active (FIG. 8) and inactive (FIG. 9) positions. The tab 144 and the configuration of the connector 142 can allow a user to flip the faucet mountable water conditioning device 100a between the active (FIG. 8) and inactive (FIG. 9) positions using a single hand.

Depending upon the water conditioning source, it may be desirable that water flowing through the faucet mountable water conditioning device 100a is within a given range of pressure. To help ensure this, the connector 142 can have a configuration that causes the base to move out of the active position (FIG. 8) when the pressure of the faucet exceeds a certain level. Alternatively, the mounting mechanism 104a can be configured to release from the faucet when the pressure of the faucet exceeds a certain level.

In one or more implementations, the connector 142 can have a configuration that locks the faucet mountable water conditioning device 100a in both active (FIG. 8) and inactive (FIG. 9) positions. For example, in one or more implementations the connector 142 can further include a flange 146. The flange 146 can have a mating configuration with the tab 144. Thus, when moved into the active position, the flange 146 and tab 144 can mate together; thereby, locking the faucet mountable water conditioning device 100a into the active position. The ability to lock the faucet mountable water conditioning device 100a in the active position can help ensure that the flow of water through the faucet mountable water conditioning device 100a does not move the base 106a out of the active position.

In one or more implementations, the flange 146 can include a male component that has a snap fit engagement with a female component on the tab 144, or vice versa. In alternative implementations, the flange 146 and the tab 144 can be magnetically attracted to each other. For example, a magnet can be disposed within the flange 146 or the tab 144 and a magnetically attractable material (i.e., a metal or another magnet) can be correspondingly disposed within the other of the flange 146 and the tab 144. In such implementations, a magnetic force can provide the force that locks the faucet mountable water conditioning device 100a in the active position. In any event, the faucet mountable water conditioning device 100a can include one or more mechanisms that selectively lock the base 106a into the active position.

Additionally, the faucet mountable water conditioning device 100a can include one or more locking mechanisms that selectively lock the base 106a into the inactive position. For example, the connector 142 can include an upper component 148 and a lower component 150. The upper and lower components 148, 150 can mate together when the faucet mountable water conditioning device 100a is in the inactive position. In one or more implementations, the upper component 148 can include a male component that has a snap fit engagement with a female component on the lower component 150, or vice versa.

In alternative implementations, the upper component 148 and the lower component 150 are magnetically attracted to each other. For example, a magnet can be disposed within the upper component 148 or the lower component 150 and a magnetically attractable material can be correspondingly disposed within the other of the upper component 148 and the lower component 150. The ability to lock the faucet mountable water conditioning device 100a in the inactive position can help ensure that the weight of the base 106a or the water conditioning source does not cause the base 106a to inadvertently move out of the inactive position.

In one or more additional implementations, the faucet mountable water conditioning device 100a can include a biasing member that biases the base 106a toward the inactive position (FIG. 9). In such implementations, once a user (or other force) unlocks the base 106a from the mounting mechanism 104a, the biasing member can automatically move the base 106a toward, or into, the inactive position (FIG. 9). The biasing member can comprise a spring or other mechanism sufficient to automatically move the base 106a toward, or into, the inactive position.

Figure 10:
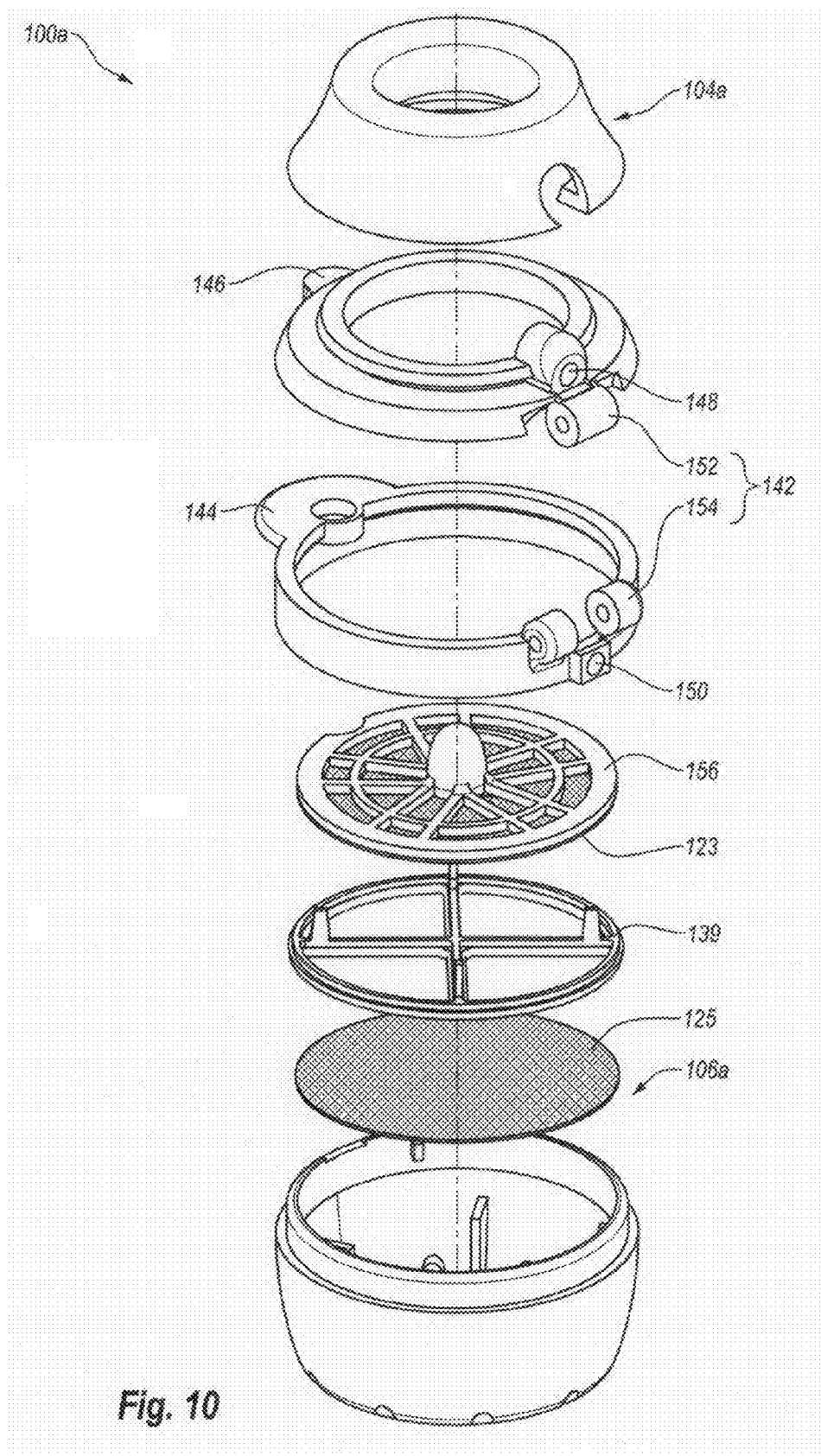
FIG. 10 illustrates an exploded view of the faucet mountable water conditioning device of FIG. 7.

FIG. 10 illustrates and exploded view of the faucet mountable water conditioning device 100a. FIG. 10 illustrates that in one or more implementations the connector 142 can include a top member 152 and a bottom member 154. The top member 152 can attach to the mounting mechanism 104a and the bottom member 154 can attach to the base 106a. In alternative implementations, the top member 152 of the connector 142 can be integrally formed with the mounting mechanism 104a.

Similarly, in one or more implementations, the bottom member 154 of the connector 142 can be integrally formed with the base 106a. Alternatively, a bayonet fitting or a threaded interface can removably connect the base 106a to the bottom member 154 of the connector 142. Such a removable connection can allow a user to selectively remove the base 106a from the connector 142 to replace or exchange the water conditioning source stored in the base 106a without having to completely dismount the faucet mountable water conditioning device 100a from the faucet.

FIG. 10 further illustrates that in one or more implementations the faucet mountable water conditioning device 100a can include a grill 156. The grill 156 can couple to the base 106a. The grill 156 can serve to hold a water conditioning source, such as a tablet, within the base 106a when the faucet mountable water conditioning device 100a is in the inactive position. Additionally, the grill 156 can help disperse water passing into the base 106a across a tablet or other water conditioning source within the base 106a. Furthermore, the grill 156 can prevent over insertion of a faucet into mounting mechanism 104a, prevent contact with water conditioning source through inlet 108, and/or prevent the water conditioning source from falling out of faucet mountable water conditioning device 100a through inlet 108 when the faucet mountable water conditioning device 100a is removed from faucet or flipped out of the way during non-use.

Figure 11A:
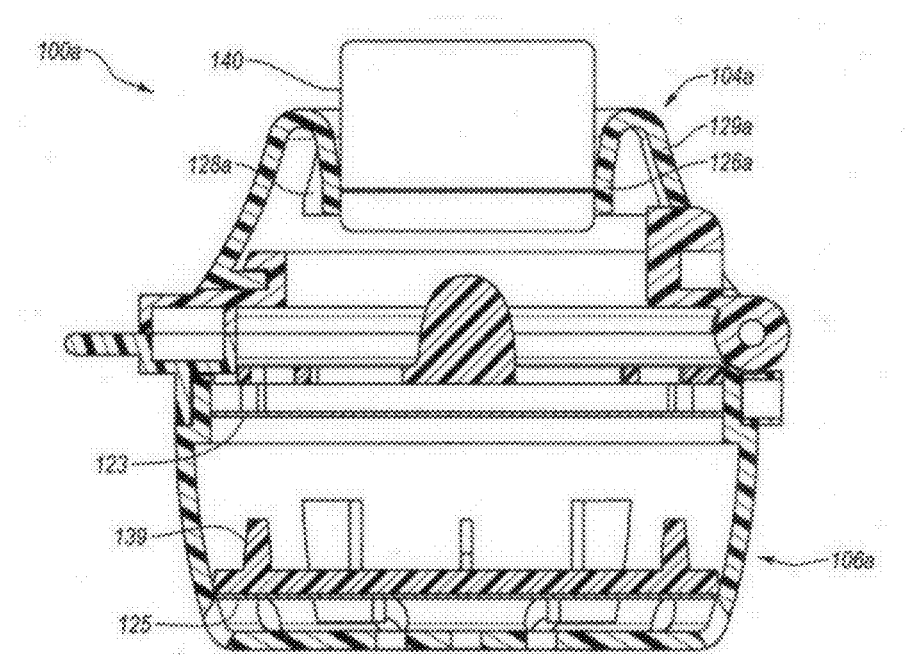
FIG. 11A illustrates a cross-sectional view of the faucet mountable water conditioning device of FIG. 7, taken along the section line 11A-11A of FIG. 7, albeit with the mounting mechanism secured to a faucet.
Figure 11B:
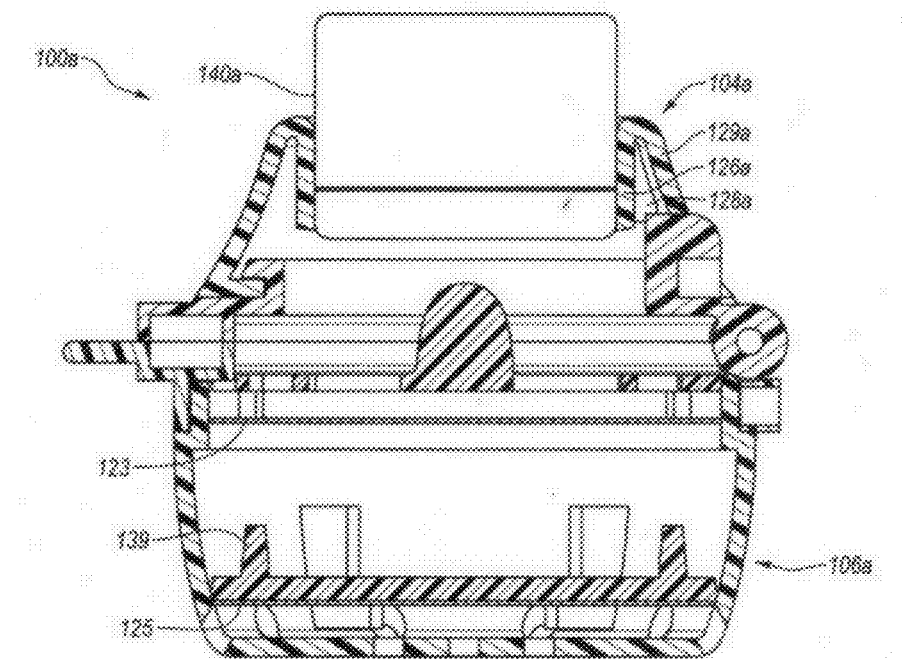
FIG. 11B illustrates a cross-sectional view of the faucet mountable water conditioning device of FIG. 7 similar to that of FIG. 11A, albeit with the mounting mechanism secured to a larger sized faucet.

As previously mentioned, the mounting mechanism 104a can allow a user to secure the faucet mountable water conditioning device 100a to a wide variety of faucets or other devices (i.e., hose, spigot). As shown by FIGS. 11A and 11B, the mounting mechanism 104a can include an inner tapered wall 126a. Similar to the inner tapered wall 126, the inner tapered wall 126a can comprise a resilient material that allows the inner tapered wall 126a to conform to a faucet or other object placed therein. The inner tapered wall 126a can allow a user to push the mounting mechanism 104a onto faucets with different sizes and shapes.

FIG. 10 further illustrates that in one or more implementations the faucet mountable water conditioning device 100a can include one or more inserts 123, 125. The inserts 123, 125 can be similar in construction and function as the inserts 123, 125 described herein above. For example, the inserts 123, 125 can divide the interior cavity of the faucet mountable water conditioning device 100a into two or more compartments or filter water entering or exiting the faucet mountable water conditioning device 100a. Of course other implementations may not include inserts 123, 125. In such implementations the grill 156 can divide the faucet mountable water conditioning device 100a into an upper compartment and a lower compartment.

One or more implementations can also include a lower frame 139. The lower frame 139 can support the insert 125. For example, in one or more implementations the insert 125 can be coupled to the lower frame. Additionally or alternatively, the lower frame 139 can support the water conditioning source.

The resilient material of the inner tapered wall 126a can allow the mounting mechanism 104a to conform to, and seal about, a wide variety of different sized and/or shaped faucets. For example, the mounting mechanism 104a can allow the faucet mountable water conditioning device to connect to any number of faucet designs. For example, in addition to attaching to a kitchen faucet, the mounting mechanism 104a can couple to a bathroom faucet, a showerhead, a garden hose, or other water source.

As shown by FIG. 11A, when attached to a faucet 140, the inner tapered wall 126a can press against the faucet 140, which can force at least a portion of the inner tapered wall 126a into a substantially vertical configuration. The substantially vertical configuration of the inner tapered wall 126a can allow the inner tapered wall 126a to create a seal with the faucet 140. Furthermore, the substantially vertical configuration of the inner tapered wall 126a can provide the faucet mountable water conditioning device 100a with lateral stability such that the faucet mountable water conditioning device 100a cannot be easily moved laterally relative to the faucet 140.

FIG. 11A illustrates the mounting mechanism 104a secured about a first faucet 140, while FIG. 11B illustrates the mounting mechanism secured about a second, larger faucet 140a. As shown by a comparison of FIGS. 11A and 11B, the larger sized faucet 140a can force a greater portion of the inner tapered wall 126a into a substantially vertical configuration. One will appreciate in light of the disclosure herein the longer the length the inner tapered wall 126a extends radially inward, the greater range of faucet sizes the mounting mechanism 104a can accommodate.

Figure 12:
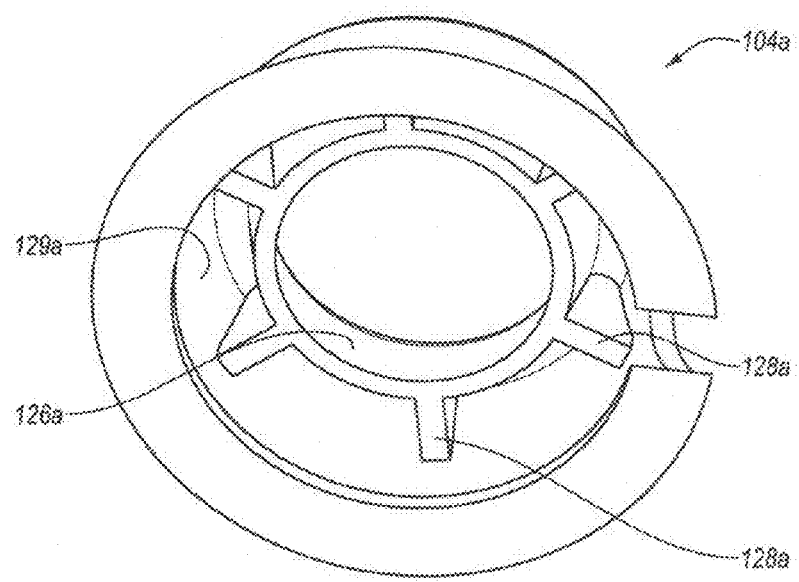
FIG. 12 illustrates an interior view of the mounting mechanism of the faucet mountable water conditioning device of FIG. 7.

As illustrated by FIGS. 11A, 11B, and 12, in one or more implementations, the mounting mechanism 104a can include ribs 128a (similar to ribs 128 described above) extending between the inner tapered wall 126a and the outer wall 129a of the mounting mechanism 104a. The ribs 128a can provide hoop forces sufficient to allow the inner tapered wall 126a to conform to, and seal about, a faucet 140, 140a. FIG. 12 illustrates that unlike the mounting mechanism 104, in one or more implementations the mounting mechanism 104a may not include side spacers.

In additional or alternative implementations, the mounting mechanism 104 can be sized and configured to receive a fitting sleeve. The fitting sleeve can comprise a lip and a wall. The wall can be configured to rest within the mounting mechanism 104 to allow the mounting mechanism to fit about smaller diameter faucets. Such fitting sleeves can provide the mounting mechanism 104 with the ability to seal about a wide range of faucet sizes.

Figure 13:
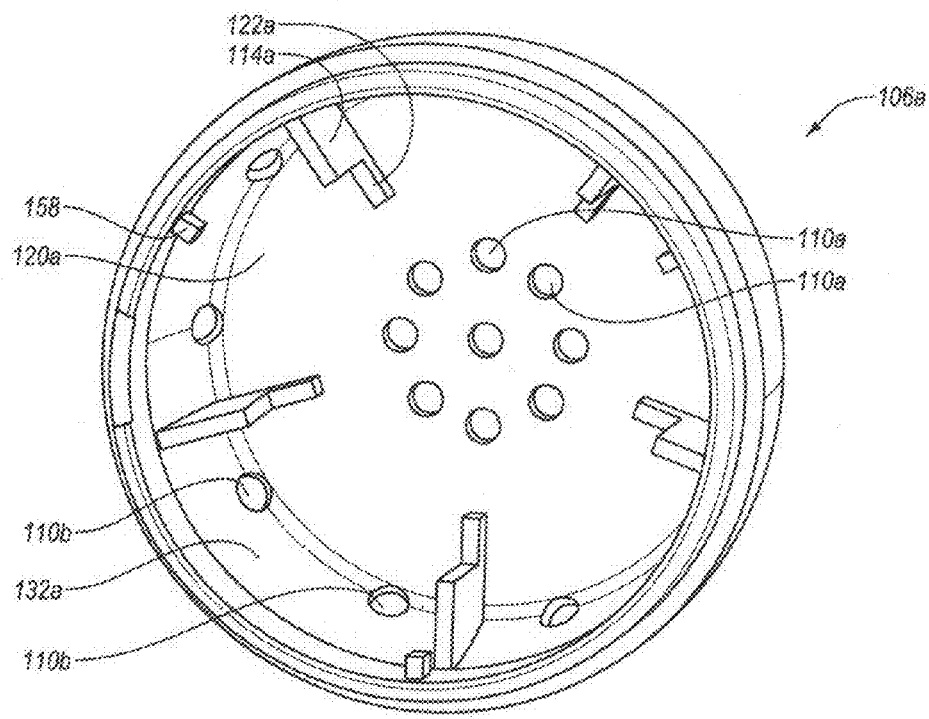
FIG. 13 illustrates an interior view of the base of the faucet mountable water conditioning device of FIG. 7.

Referring now to FIG. 13, an interior view of the base 106a is illustrated. The base can include a bottom surface 120a and a sidewall 132a similar to the base 106. Furthermore, the base 106a can include a plurality of central outlet holes 110a and periphery outlet holes 110b. Additionally, the base 106a can have a size and configuration that allows the base 106a to hold a water conditioning source. One will appreciate in light of the disclosure herein that the base 106a can comprise any number of various different shapes and sizes. In one or more implementations, the base 106a is broader or wider than the inlet defined by mounting mechanism 104a.

As previously mentioned, in one or more implementations the water conditioning source can comprise a tablet. As water passes into the base 106a, the water can flow about the water conditioning source, thereby dissolving the water conditioning source and conditioning the water. To help ensure that water can flow about the water conditioning source, the base 106a can include one or more spacers.

For example, FIG. 13 illustrates that the base 106a can include a plurality of bottom spacers 122a. The bottom spacers 122a can space the tablet or other water conditioning source from the bottom surface 120a of the base 106a, thereby ensuring a passage between the bottom surface and the water conditioning source. FIG. 13 also illustrates that the base 106a can include a plurality of side or wall spacers 114a. The wall spacers 114a can space the tablet or other water conditioning source from the wall 132a of the base 106a, thereby ensuring a passage between the wall 132a and the water conditioning source. The base 106a can further include one or more pegs 158 that support or otherwise hold the inserts or a grill. The pegs 158 can extend radially outward into the interior of the base 106a.

Figure 14:
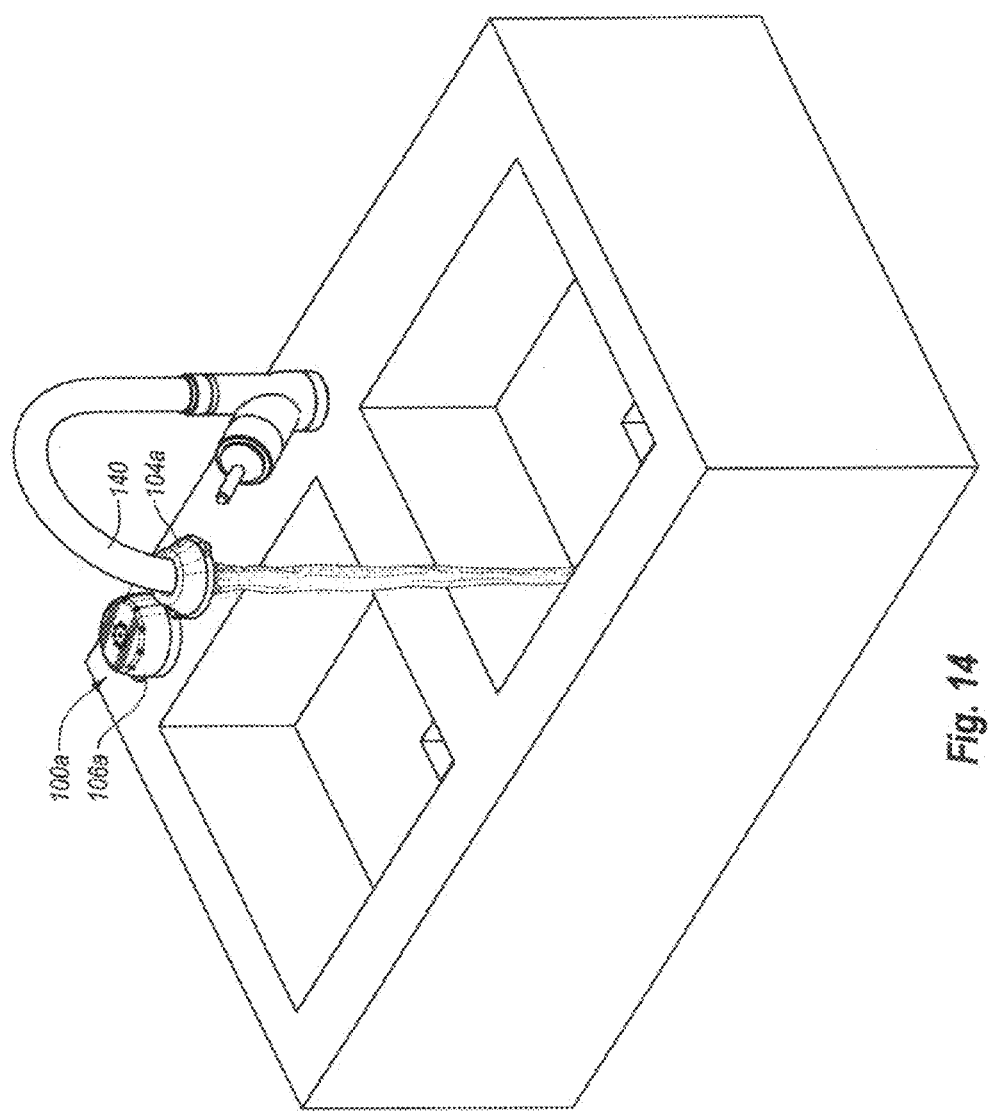
FIG. 14 illustrates a view of the faucet mountable water conditioning device of FIG. 7 secured to a faucet in an inactive position.

Referring now to FIGS. 14 and 15, views of the faucet mountable water conditioning device 100a secured to a faucet 140 are shown. FIG. 14 illustrates the faucet mountable water conditioning device 100a in the inactive position (i.e., out of line and vertically adjacent the mounting mechanism 104a). When in the inactive position, water can flow from the faucet 140, through the mounting mechanism 104a, and directly into the sink. One will appreciate in light of the disclosure herein that the connector can allow a user to flip the base 106a out of the sink. The ability to flip the base 106a out of the sink can allow user to access substantially the entire sink volume when the faucet mountable water conditioning device 100a is in the inactive position.

FIG. 15 illustrates the faucet mountable water conditioning device 100a in the active position (i.e., in-line and vertically below the mounting mechanism 104a). As shown by FIG. 15, the mounting mechanism 104a can allow the base 106a to be mounted directly below the outlet of a faucet 140. In other words, the faucet mountable water conditioning device 100a can ensure that the base 106a (and a water conditioning source therein) is directly in line with water exiting a faucet 140. The in-line configuration of the faucet mountable water conditioning device 100a can help ensure the flow of the water is not significantly reduced as it passes through the faucet mountable water conditioning device 100a.

Additionally, the ability to flip the base 106a away from the mounting mechanism 104a can allow a user to selectively move the faucet mountable water conditioning device 100a from an active position (FIG. 15) to an inactive position (FIG. 14). When in the active position, water exiting the faucet 140 will be conditioned as it flows through the base 106a. When in the inactive position, water exiting the faucet 140 will not pass through the base and will not be conditioned. Thus, a user can "turn on" and "turn off" the faucet mountable water conditioning device 100a without having to dismount the device from the faucet 140.

FIGS. 16 and 17 illustrate yet another faucet mountable water conditioning device 100b. The faucet mountable water conditioning device 100b includes a mounting mechanism 104a and base 106a similar to those described hereinabove in reference to FIGS. 7-15. The faucet mountable water conditioning device 100b also includes a connector 142a. The connector 142a allows a user to move the faucet mountable water conditioning device 100b between an active position (FIG. 16), in which the base 106a is in line with the faucet and a delivered stream of water, and an inactive position (FIG. 17), in which the base 106a is moved out of line with the faucet and delivered stream of water.

As shown by FIGS. 16 and 17, the connector 142a can comprise a vertical pivot pin or hinge that allows a user to swivel or rotate the base 106a relative to the mounting mechanism 104a. In particular, the connector 142a can allow the base 106a to rotate about a generally vertical axis between an active position (FIG. 16), in which the base 106a is below and in line with the mounting mechanism 104a, and an inactive position (FIG. 17), in which the base 106a is out of alignment with, yet still below, the mounting mechanism 104a. In alternative implementations, the connector 142a can comprise a pivot pin, swivel, track, or other mechanism that allows the base 106a to swivel or rotate away from an in-line configuration with the mounting mechanism 104a (and a faucet attached thereto) while remaining within the same horizontal plane.

The faucet mountable water conditioning devices of one or more implementations of the present invention can be disposable. In other words, once a water conditioning source, such as a tablet, included therein nearly or completely dissolves, the faucet mountable water conditioning device can be disposed of and replaced with a new the faucet mountable water conditioning device. Alternatively, the faucet mountable water conditioning devices can have a configuration to allow for replacement of a spent water conditioning source with a new one. Thus, one or more implementations can include water conditioning source refills.

Depending upon the active component(s) in the water conditioning source 113, refill or replacement water conditioning sources can be supplied in different packages/manners. For example, FIG. 18 illustrates that in one or more implementations, a refill package 160 can a base 106b with a pre-loaded tablet. In such implementations, the user can dispose of the old base 106 and replace it with the base 106b included in the refill package 160. By including a refill base 106b in the refill package, the user need not handle the replacement tablet directly when refilling a faucet mountable water conditioning device. In another implementation, the water conditioning source can comprise a liquid.

Furthermore, FIG. 18 illustrates that in one or more implementations the refill base 106b can include shutters 162, 164. The shutters 162, 164 can seal off the inlet to the refill base 106b and the outlet holes 110 to prevent any powder or active component from escaping from the refill base 106b prior to attachment to the mounting mechanism 104. Once a user secures the refill base 106b to the mounting mechanism 104 or connector 142, 142a, such as by twisting a threaded or bayonet connection together as indicated by the arrow of FIG. 18, vents 166 can automatically open to expose the inlet to the refill base 106b and the outlet holes 110.

In alternative implementations, the refill base 106b may include a removable plastic film to seal off the inlet to the refill base 106b and the outlet holes 110 instead of shutters 162, 164. In such implementations, the user can remove the plastic film prior to securing the refill base 106b to the mounting mechanism 104 or connector 142, 142a. In still further implementations, the refill water conditioning source can be packaged in a dissolvable cover, which can dissolve upon contact with water. In any event, one will appreciate that in one or more implementations a user need not handle the refill water conditioning source directly.

In one or more additional implementations, the refill package 160 may include a refill water conditioning source, but not a refill base 106b. In such implementations, a user can open the faucet mountable water conditioning device by separating the base 106 and mounting mechanism 104 (or even just positioning the base in the inactive position) and place the refill water conditioning source therein. Such implementations may not require that the base be replaced.

In still further implementations, the replacement tablet or other water conditioning source can include stick extending therein. To place the replacement tablet into the faucet mountable water conditioning device, the user can handle the stick only. In such implementations the user can refill a faucet mountable water conditioning device without directly handling the refill tablet or replacing the base.

The present invention may be embodied in other specific forms without departing from its spirit or essential characteristics. For example, one or more implementations may not include a mounting mechanism 104, 104a. Alternatively, the faucet mountable water conditioning device can include a spray head attachment to allow for attached to odd-shaped sprayer heads. Such a spray head attachment can comprise a low profile disk configuration sized to snug up against the aerator that sits in the middle of nearly every sprayer head. Furthermore, such a spray head attachment can include thin ribs to give it rigidity, yet not block the flow of the water when flipped out of the way. Such a spray head attachment 142 can be affixed to a sprayer head with glue that can be released when upon twisting.

Accordingly, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A faucet mountable water conditioning device, comprising:
   a. a mounting mechanism defining an inlet, the mounting mechanism including an outer wall and an annular inner wall that tapers radially inward, wherein the annular inner wall comprises a resilient material and is configured to conform to, and seal about, a plurality of different sized faucets;
   b. a base coupled to the mounting mechanism, the base having a side wall and a bottom surface defining a compartment sized and configured to hold a water conditioning liquid;
   c. one or more outlet holes extending through the bottom surface; and
   d. wherein the base comprises one or more shields configured to selectively cover the one or more outlet holes and the one or more shields are configured to automatically open when the base is secured to a connector.

2. The faucet mountable water conditioning device as recited in claim 1, further comprising one or more spacers extending from the bottom surface, the one or more spacers being configured to space the water conditioning liquid from the bottom surface.

3. The faucet mountable water conditioning device as recited in claim 1, further comprising a plurality of ribs extending between the outer wall and the annular inner wall of the mounting mechanism.

4. The faucet mountable water conditioning device as recited in claim 1, wherein the annular inner wall is devoid of threads.

5. The faucet mountable water conditioning device as recited in claim 1, further comprising a connector coupling the base to the mounting mechanism, the connector being configured to position the conditioning liquid in an active position in line with the mounting mechanism, and an inactive position, in which the conditioning liquid is out of alignment with the mounting mechanism.

6. The faucet mountable water conditioning device as recited in claim 5, wherein the connector comprises a horizontal pivot configured to allow the base to rotate to a position vertically adjacent the mounting mechanism.

7. The faucet mountable water conditioning device as recited in claim 1, wherein at least a portion of the base is transparent.

8. The faucet mountable water conditioning device as recited in claim 1, wherein the bottom surface of the base has a larger area than an area of the inlet defined by the mounting mechanism.

9. The faucet mountable water conditioning device as recited in claim 1, further comprising a plurality of outlet holes extending through the side wall, whereby fluid exiting the plurality of outlet holes is directed radially outward of the inlet defined by the mounting mechanism.

10. A faucet mountable water conditioning device, comprising:
  a. a mounting mechanism defining an inlet for receiving a stream of water from a faucet, the mounting mechanism including an outer wall and an annular inner wall that tapers radially inward, wherein the annular inner wall comprises a resilient material and is configured to conform to, and seal about, a plurality of different sized faucets;
  b. a base having a side wall, a bottom surface, and one or more outlet holes extending through one or more of the side wall and bottom surface, wherein the base comprises one or more shields configured to selectively cover the one or more outlet holes and the one or more shields are configured to automatically open when the base is secured to a connector; and
  c. the connector coupling the base to the mounting mechanism, the connector being configured to allow the base move between an active position and an inactive position;
  d. wherein, in the active position, the base is positioned within a liquid flow path, and an inactive position, the base is positioned away from the liquid flow path.

11. The faucet mountable water conditioning device as recited in claim 10, wherein the base defines a generally hollow compartment sized and configured to hold a water conditioning tablet.

12. The faucet mountable water conditioning device as recited in claim 11, further comprising:
  a plurality of bottom spacers extending from the bottom surface of the base
  wherein the bottom spacers are configured to prevent the water conditioning tablet from covering one or more outlet holes extending through the bottom surface and to allow a tablet not to contact standing water when a faucet is turned off.

13. The faucet mountable water conditioning device as recited in claim 10, wherein the bottom surface of the base has a larger area than an area of the inlet defined by the mounting mechanism.

14. The faucet mountable water conditioning device as recited in claim 10, further comprising a plurality of outlet holes positioned at the intersection of the side wall and bottom surface whereby fluid exiting the plurality of outlet holes is directed radially outward of the inlet defined by the mounting mechanism.

15. The faucet mountable water conditioning device as recited in claim 10, wherein at least a portion of the base is transparent.

16. The faucet mountable water conditioning device as recited in claim 10, further comprising:
  a. a grill extending across the base;
  b. wherein the grill is configured to maintain a water conditioning tablet within the base when in the inactive position.

* * * * *